United States Patent
Schuster et al.

(10) Patent No.: US 9,447,568 B1
(45) Date of Patent: Sep. 20, 2016

(54) TOILET FILL VALVE WITH VALVE LOCK

(71) Applicant: Danco, Inc., Irving, TX (US)

(72) Inventors: Michael J. Schuster, Shorewood, IL (US); Larry L. Schneider, Wadsworth, IL (US)

(73) Assignee: Danco, Inc., Irving, TX (US)

( * ) Notice: Subject to any disclaimer, the term of this patent is extended or adjusted under 35 U.S.C. 154(b) by 128 days.

(21) Appl. No.: 14/450,782

(22) Filed: Aug. 4, 2014

Related U.S. Application Data

(60) Continuation of application No. 13/676,229, filed on Nov. 14, 2012, now Pat. No. 8,813,775, which is a continuation of application No. 12/875,199, filed on Sep. 3, 2010, now Pat. No. 8,333,215, which is a division of application No. 11/738,029, filed on Apr. 20, 2007, now Pat. No. 7,926,511.

(60) Provisional application No. 60/745,293, filed on Apr. 21, 2006.

(51) Int. Cl.
*E03D 1/32* (2006.01)
*F16K 35/00* (2006.01)
*F16K 31/24* (2006.01)

(52) U.S. Cl.
CPC ............. *E03D 1/32* (2013.01); *F16K 31/24* (2013.01); *F16K 35/00* (2013.01)

(58) Field of Classification Search
CPC .......... E03D 1/32; F16K 31/24; F16K 35/00
USPC ................ 137/15.26, 409, 410, 434, 565.19; 251/90, 95, 111
See application file for complete search history.

(56) References Cited

U.S. PATENT DOCUMENTS

| | | |
|---|---|---|
| 2,512,176 A | 6/1950 | Shaffer |
| 2,791,235 A | 5/1957 | Smith |
| 3,040,769 A | 6/1962 | Lamb |
| 3,457,947 A | 7/1969 | Fitzgerald |
| 3,986,216 A | 10/1976 | Davis et al. |
| 3,994,628 A | 11/1976 | Kemper |
| 4,007,498 A | 2/1977 | Pearson |
| 4,017,916 A | 4/1977 | Pearson |
| 4,032,822 A | 6/1977 | Un |
| 4,090,532 A | 5/1978 | Story, Jr. |
| 4,145,775 A | 3/1979 | Butler |
| 4,351,071 A | 9/1982 | Clar |
| 4,391,003 A | 7/1983 | Talerico et al. |
| 4,392,260 A | 7/1983 | Bensen |
| 4,420,845 A | 12/1983 | Antunez |
| 4,485,501 A | 12/1984 | Kloner |
| 4,700,413 A | 10/1987 | Lopez |
| 4,707,867 A | 11/1987 | Kawabe et al. |
| 4,764,996 A | 8/1988 | Pino |
| 4,770,388 A | 9/1988 | Carman |
| 4,793,588 A | 12/1988 | Laverty, Jr. |

(Continued)

*Primary Examiner* — Craig Schneider
*Assistant Examiner* — Nicole Wentlandt

(57) ABSTRACT

Disclosed are various embodiments of a lockable toilet fill valve and methods according to the present invention. In one embodiment, a toilet fill valve includes a float/arm assembly. The toilet fill valve is closed when the float/arm assembly is disposed in a first position. The toilet fill valve being open when the float/arm assembly is disposed in a second position. A valve lock is associated with the float/arm assembly. The valve lock includes an unlock position and a lock position, wherein the valve lock fixes the float/arm assembly in the first position when the valve lock is in the lock position.

20 Claims, 46 Drawing Sheets

(56) References Cited

U.S. PATENT DOCUMENTS

| | | |
|---|---|---|
| 4,918,764 A | 4/1990 | Haselswerdt et al. |
| 4,980,932 A | 1/1991 | Stemples |
| 5,007,452 A | 4/1991 | Antunez |
| 5,036,553 A | 8/1991 | Sanderson |
| 5,052,060 A | 10/1991 | Makita et al. |
| 5,083,323 A | 1/1992 | Cannan |
| 5,134,729 A | 8/1992 | Shaw |
| 5,232,001 A | 8/1993 | Machelett |
| 5,232,011 A | 8/1993 | Royalty |
| 5,245,710 A | 9/1993 | Haselswerdt et al. |
| 5,327,931 A | 7/1994 | Royalty et al. |
| 5,362,026 A | 11/1994 | Kobayashi et al. |
| 5,432,959 A | 7/1995 | Ellsworth et al. |
| 5,442,820 A | 8/1995 | Becker |
| 5,469,586 A | 11/1995 | Tsutsui et al. |
| 5,542,448 A | 8/1996 | Campbell et al. |
| 5,708,991 A | 1/1998 | DeMarco |
| 5,715,860 A | 2/1998 | Horad |
| 5,742,951 A | 4/1998 | Wright et al. |
| 5,775,366 A | 7/1998 | Ray et al. |
| 6,202,227 B1 | 3/2001 | Gurowitz |
| 6,209,576 B1 | 4/2001 | Davis |
| 6,263,519 B1 | 7/2001 | Parsons et al. |
| 6,499,152 B2 | 12/2002 | Johnson |
| 6,560,790 B2 | 5/2003 | Saar et al. |
| 6,837,264 B1 | 1/2005 | Schuster |
| 2002/0092090 A1 | 7/2002 | Johnson |
| 2002/0162166 A1 | 11/2002 | Saar et al. |

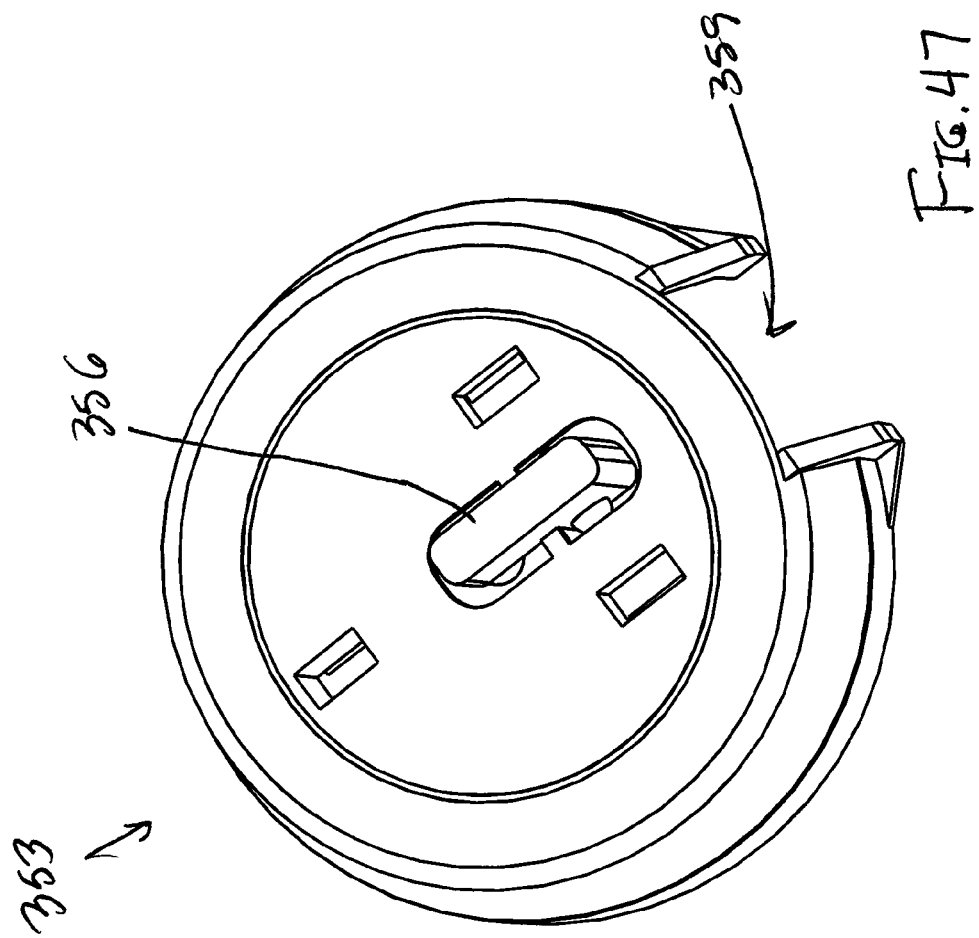

TOILET FILL VALVE WITH VALVE LOCK

CROSS REFERENCE TO RELATED CASES

This application is a continuation of, and claims priority to, U.S. Patent Application entitled "TOILET FILL VALVE WITH VALVE LOCK" filed on Nov. 14, 2012 and assigned application Ser. No. 13/676,229, which is a continuation of, and claims priority to, U.S. Patent Application entitled "TOILET FILL VALVE WITH VALVE LOCK" filed on Sep. 3, 2010 and assigned application Ser. No. 12/875,199, which is a division of, and claims priority to, U.S. Patent Application entitled "TOILET FILL VALVE WITH VALVE LOCK" filed on Apr. 20, 2007 and assigned application Ser. No. 11/738,029, which claims priority to U.S. Provisional Patent Application 60/745,293 entitled "TOILET FILL VALVE WITH VALVE LOCK," filed on Apr. 21, 2006, each of these applications being incorporated herein in its entirety.

BACKGROUND

From time to time, the components within a toilet tank may need adjustment or replacement. For example, various components within a toilet tank such as a flapper, handle chain/linkage or other components may leak or malfunction in some other manner. In many situations, a leak may result in a significant waste of water. In order to replace or fix such components, an individual may have to drain the toilet tank itself to work on the normally submerged components. However, the moment that the water level drops in a typical toilet tank, a fill valve is opened and water flows into the tank in order to refill the tank for the next flush. Consequently, to stop the flow of water into the tank, an individual typically locates a shut-off valve that is outside the toilet tank near where the water supply is supplied into the tank.

However, in the typical case, such a shut-off valve may not have been operated for years. In many situations, this means that shut-off valves often fail to work. Thus, to shut off the flow of water to the toilet tank in order to perform the desired maintenance, the individual often locates the main water shut-off valve in the entire dwelling or other building to shut the water off at such a point. Once the water has been shut off, then maintenance can be performed within the toilet tank after water is drained as no further water will flow back into the tank. After malfunctioning or old components have been maintained or replaced in the toilet tank, then the individual can manipulate the main water shut-off valve in the dwelling or other building to reestablish water pressure in the dwelling or other building.

Since the toilet tank is empty when the water is turned back on, a typical fill valve in the toilet is in an open state. Consequently, the first component within the dwelling or building that typically calls for water after the water pressure is reestablished is the fill valve within the empty toilet tank. When the water pressure was shut off within the dwelling or other building, the pressure may drop from 50 psi to 0 psi. When the pressure is reestablished by turning on the main valve, then the pressure goes back from 0 psi to 50 psi. These abrupt changes in the pressure within the piping system of a dwelling or other building typically disturb sediment and rust that has accumulated inside the walls of the pipes. Since the fill valve is usually the first thing to call for water when water pressure is reestablished, all of the rust and sediment that has loosened due to the pressure changes in the pipes heads directly for the fill valve. This sediment and rust can lodge itself within the fill valve, creating leaks and other problems.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIGS. 44-47 show various examples of rocker arm toilet fill valve locking mechanisms according to various embodiments of the present invention.

DETAILED DESCRIPTION

Figure 1:
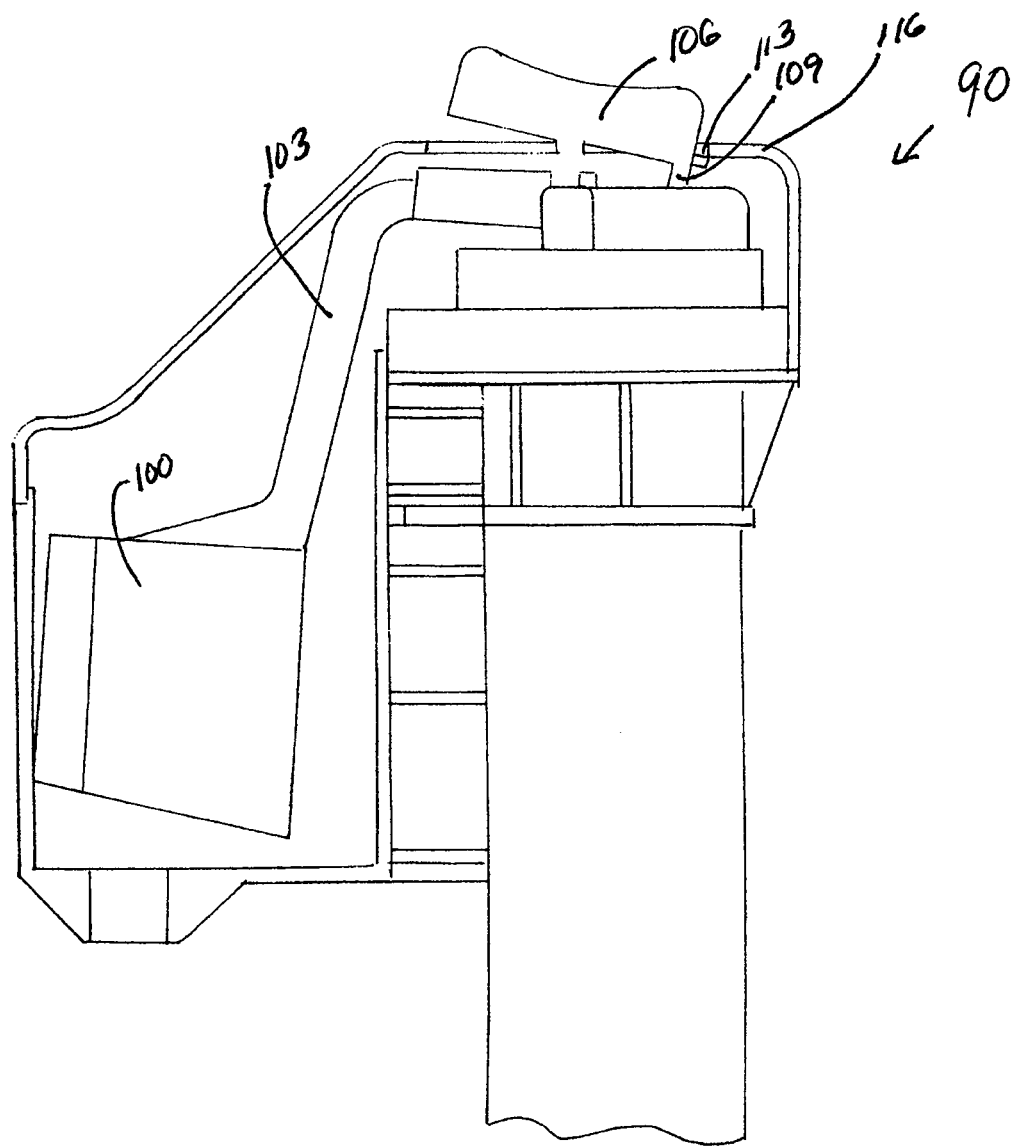
FIGS. 1-9 show various examples of rocker arm toilet fill valve locking mechanisms according to various embodiments of the present invention.

Referring to FIG. 1, shown is a portion of a fill valve 90 according to an embodiment of the present invention. The fill valve 90 includes a float 100 and an arm 103. When the water level reaches a specific height in the toilet tank, the float 100 begins to rise, the arm 103 is lifted and the fill valve 90 is turned off. When the float 100 is not lifted by water and the arm 103 falls, then the fill valve turns on. The fill valve 90 includes a rocker switch 106 with an actuating pin 109. The rocker switch 106 is a two-position switch. In the first position, the rocker switch pin 109 does not engage any portion of the arm 103.

However, in a second position as shown with respect to FIG. 1, the pin 109 associated with the rocker switch 106 compresses or contacts a back portion of the arm 103. In this respect, the portion of the arm 103 might actually be on the opposite side of a fulcrum presented by the arm 103 itself. When the pin 109 engages the arm 103 in this way, it holds the arm 103 in the upward position. Also, the float is held in the uppermost position as the float 100 is connected to the arm 103.

In this respect, the float 100 and arm 103 make up a float/arm assembly as can be appreciated. While a particular style of fill valve is shown, there are other styles where the arm 103 is connected to the float 100 by a stem. In such styles, the float 100 may wrap around the fill valve body or may be adjacent to it. Regardless of whether a stem connects the float 100 and the arm 103, or whether the float 100 and arm 103 are connected directly to each other, both represent a float/arm assembly of a fill valve as is described in many of the embodiments set forth herein. Thus, to the extent that a float 100 and arm 103 are discussed herein, the combination of the two—with or without a stem or other components in other designs—comprise a float/arm assembly.

By pressing the rocker switch 106 in the position as shown in FIG. 1, the fill valve can be maintained in an off position even though water does not push up on the float. Specifically, when the rocker switch 106 is engaged and the pin 109 is pressed down onto a portion of the arm 103, then the fill valve 90 is maintained in the closed position and water does not fill the toilet tank within which the fill valve 90 is installed.

To open the fill valve 90 for normal operation, a user need only switch the rocker switch 106 in a second position that relieves the pressure of the pin 109 against the arm 103. To hold the rocker switch 106 in the first and second positions, one or more protrusions 113 extends out of the rocker switch 106 and engages a lip of the cover 116 of the fill valve. While the cover 116 shown actually covers both the top of the fill valve, as well as, the float and the entire assembly, it is understood that in another fill valve, the cover may only cover a top portion of the fill valve where the float 100 is exposed. The rocker switch 106 may be used in a similar manner in such contexts. Thus, the rocker switch 106 according to the embodiments described herein may be used on many different styles of fill valves as one with skill in the art can appreciate.

Figure 2:
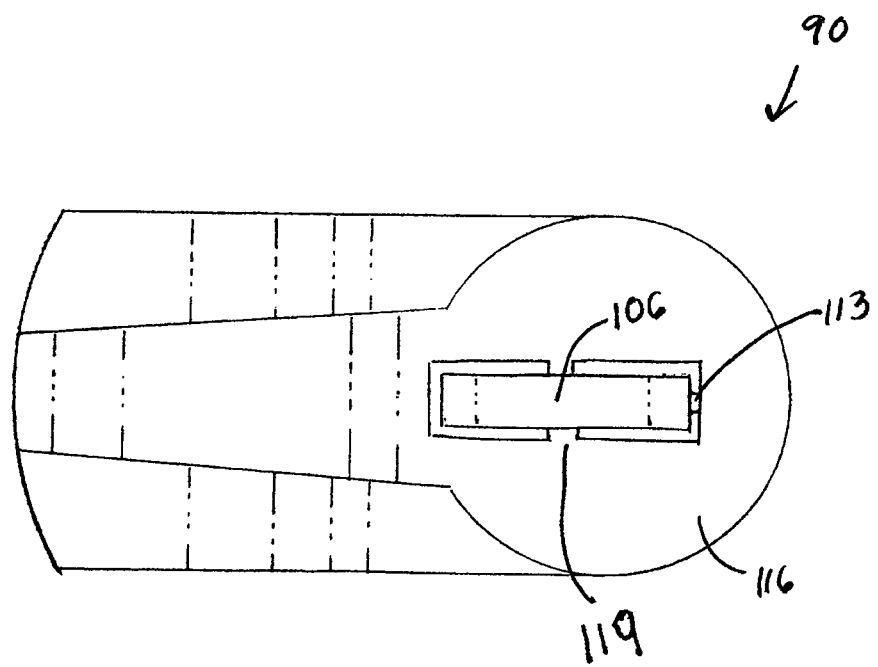

Turning to FIG. 2, shown is the rocker switch 106 as seen from a top view of the fill valve 90. The rocker switch 106 pivots about a center axis 119. In this respect, the rocker switch 106 may include a seat that grips a portion of the cover 116 extending across a gap or the rocker switch 106 may be integral with the cover, where the movement of the rocker switch 106 is accomplished by the bending of plastic. Alternatively, two pins extending from a cover 116 may engage corresponding holes inside the rocker switch 106. In addition, there are several other configurations that may be employed to facilitate the pivot of the rocker switch 106 as shown.

Figure 3:
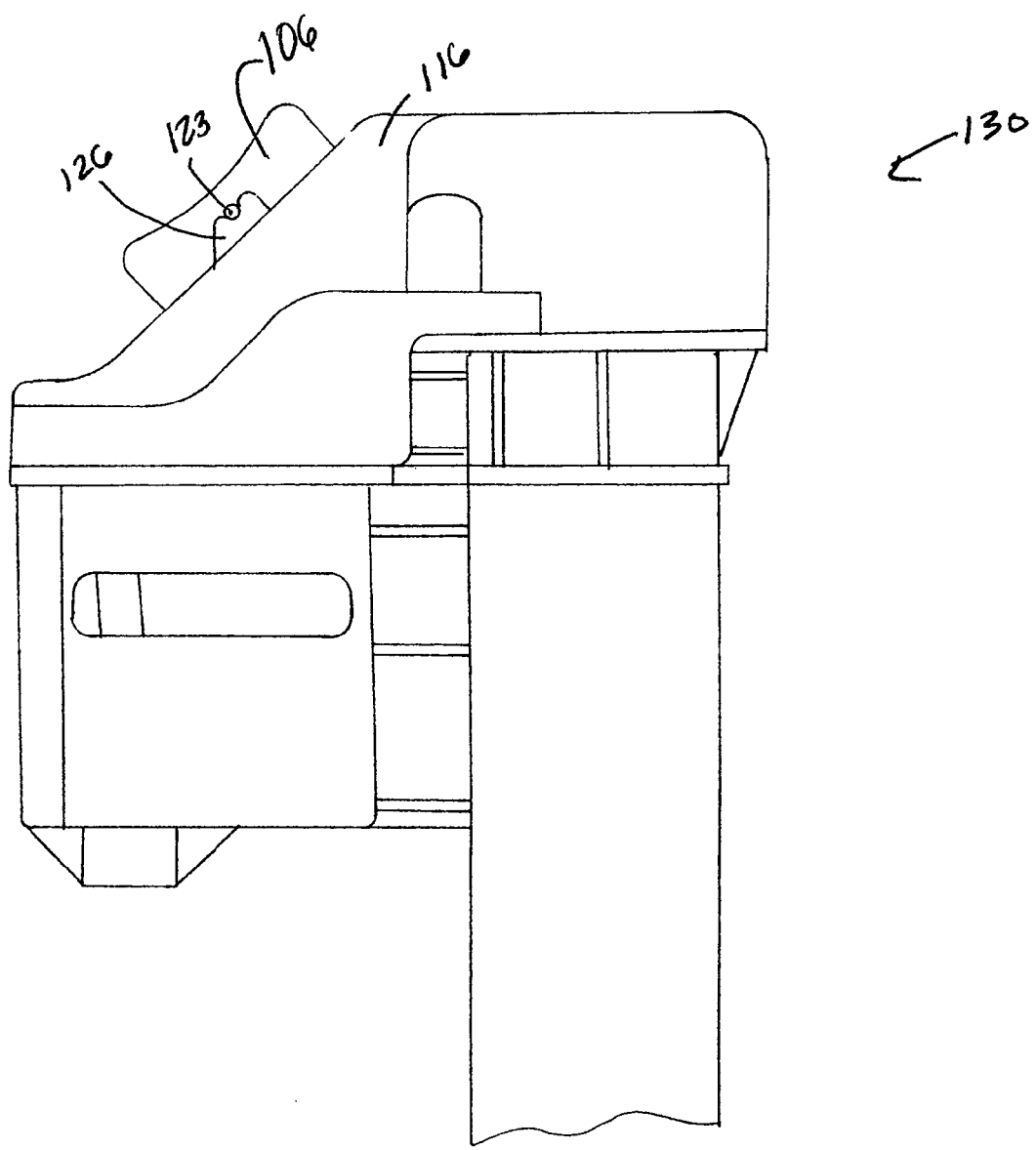

Turning next to FIG. 3, shown is a fill valve 130 according to another embodiment of the present invention. The fill valve 130 includes a rocker switch 106 according to another embodiment of the present invention. As shown, the rocker switch 106 includes pins 123 that extend from the sides of the rocker switch 106 and fit into seats 126 created in the cover 116.

Figure 4:
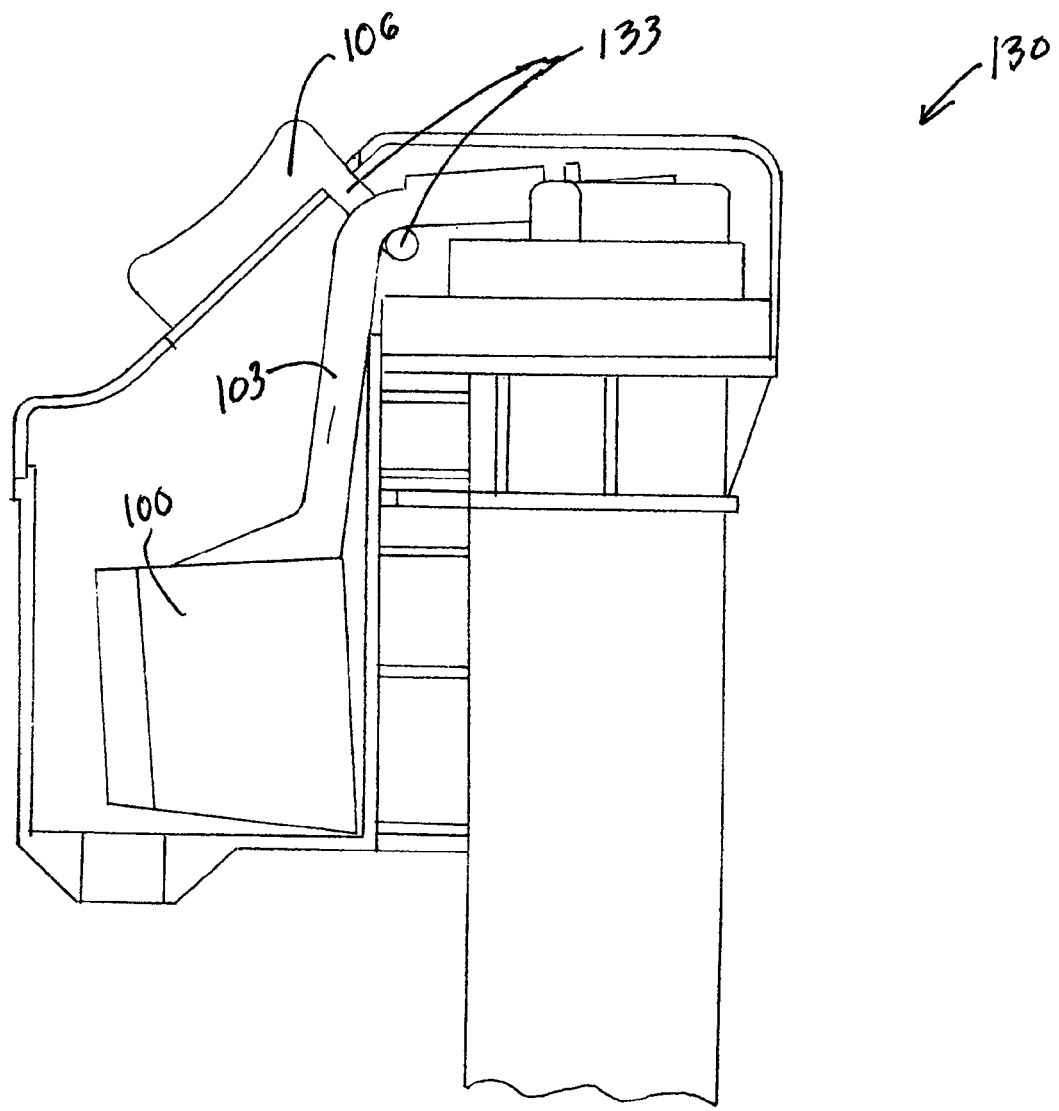

With reference next to FIG. 4, shown is a cut away view of the fill valve 130 in which the rocker switch 106 is shown having a hook structure 133 that grabs a portion of the arm 103. When the rocker switch 106 is in a first position, the hook 133 engages the arm 103 and holds the float 100 and the arm 103 in a position such that the fill valve 130 is in an off state.

When the rocker switch 106 is in a second position, the hook 133 does not interfere with the operation of the arm 103 and the float 100. The rocker switch 106 may be held in both positions by way of one or more protrusions 113 (FIG. 1) that engage a lip on the cover 116 that operates in a similar manner with the rocker switch 106 described with reference to FIG. 1.

Figure 5:
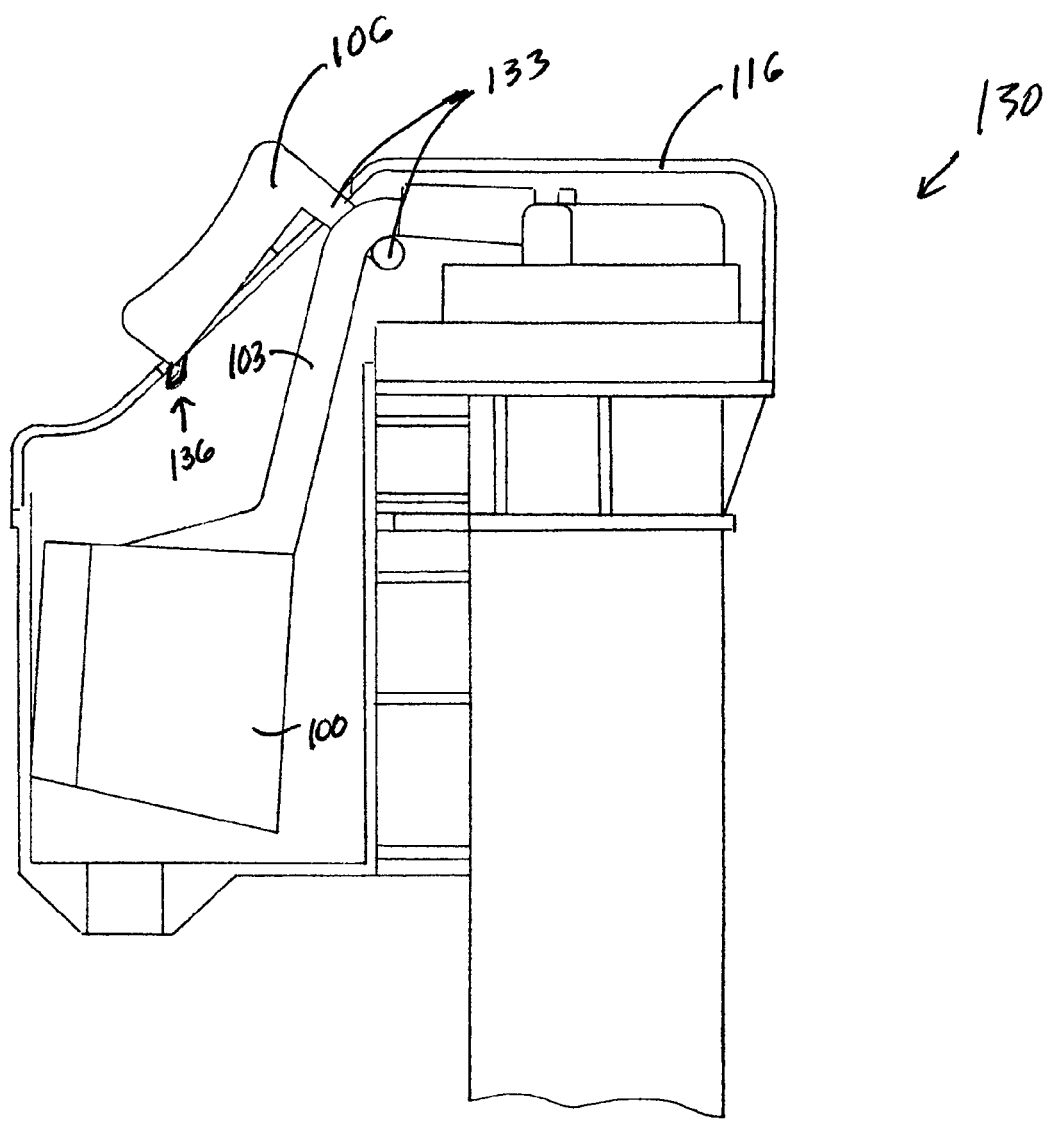
Figure 6:
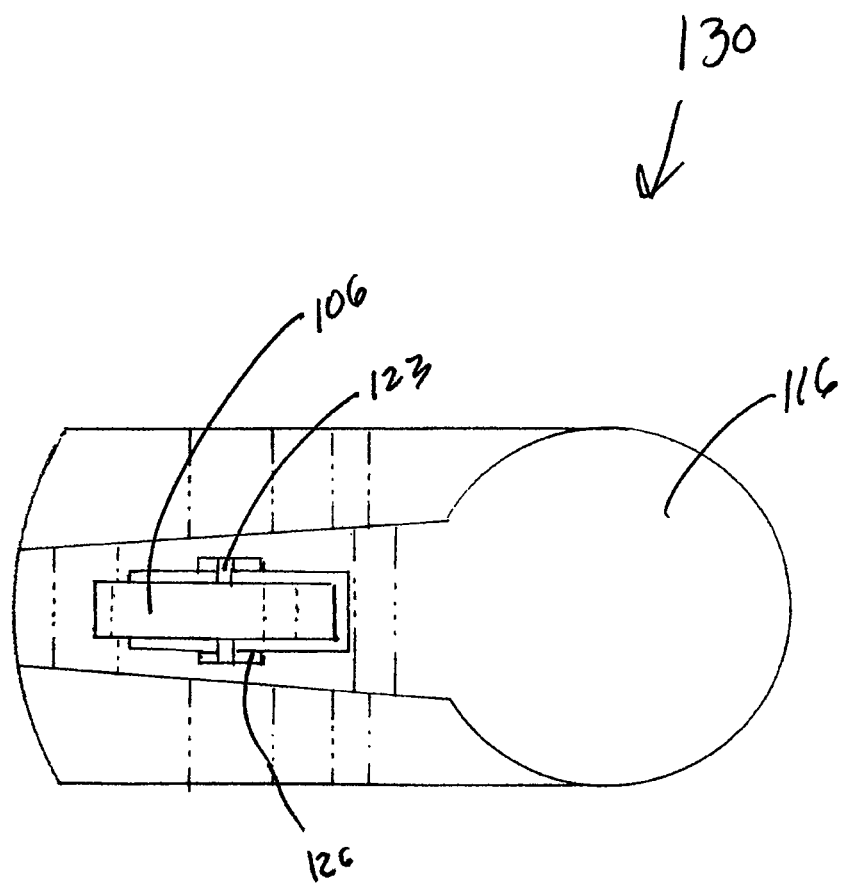

Referring next to FIG. 5, shown is the rocker switch 106 as depicted in FIG. 4 that includes a protrusion 136 on the back end of the rocker switch 106 that engages a lip of the cover 116 of the fill valve 130 in order to hold the rocker switch 106 in a particular state and present resistance between the switching of the two states, thereby allowing the rocker switch 106 to hold the arm 103 in an off position when the rocker switch 106 is in a first position and to ensure that the hook 133 does not interfere with the operation of the arm 103 when the rocker switch 106 is in a second position. In addition, other protrusions may be used with the rocker switch 106 as described herein. With reference to FIG. 6, shown is a top view of the toilet fill valve 130 in which the rocker switch 106 is depicted with pins 123 extending from the sides thereof. The pins are shown as seated in the seats 126, thereby making sure that the rocker switch 106 properly pivots relative to the cover 116 for operation.

Figure 7:
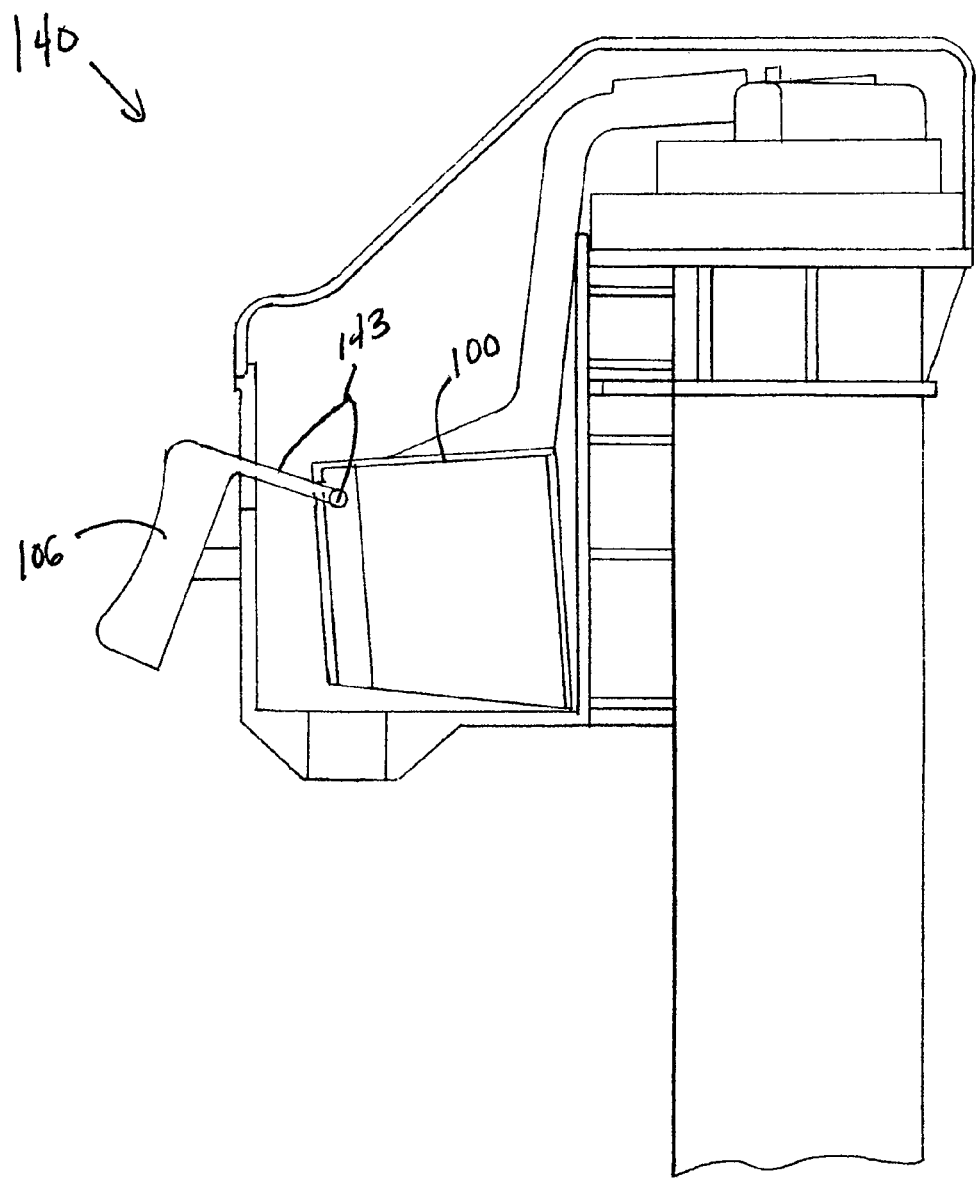

Referring next to FIG. 7, shown is a fill valve 140 according to another embodiment of the present invention. The fill valve 140 includes a rocker switch 106 with a hook 143 that extends therefrom. Alternatively, the hook 143 may be a tee or other configuration. The hook engages an inner wall of the float 100 according to the present embodiment. Specifically, when the rocker switch 106 is in a first position, the hook 143 holds the float 100 in its uppermost position, thereby holding the fill valve 140 in a closed state. In this respect, the hook 143 pulls the float 100 toward an outer portion of the cover 116 upon which the rocker switch 106 is mounted.

When the rocker switch 106 is in a second state, the hook 143 is pushed into the float 100 and the float 100 may move freely with the hole of the float 100 sliding along the shaft of the hook 143 during normal operation. It is understood that a chamber is created within the float 100 to ensure that air does not escape through the hole that accommodates the hook 143 when the water level pushes the float 100 upward, thereby closing the fill valve 140. Alternatively, the rocker switch 106 may be positioned in a different configuration where the hook 143 engages the float 100 toward the bottom of the float, thereby eliminating the need to isolate the hole through which the hook 143 extends. For example, the hook 143 may be positioned on the other end of the rocker switch 106 and may curve around the bottom of the side wall of the float 100 through the open bottom of the float 100.

Figure 8:
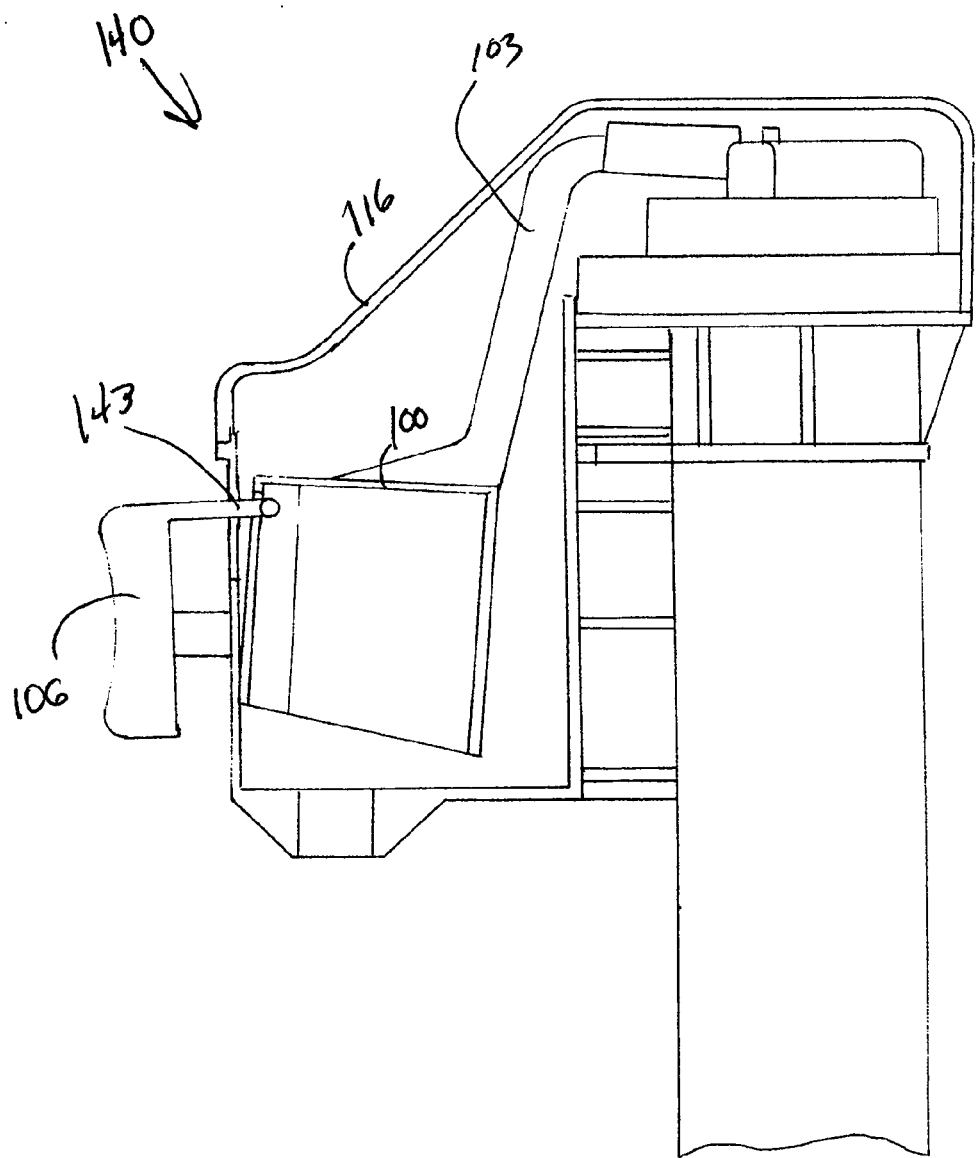

Referring to FIG. 8, shown is the fill valve 140 in which the rocker switch 106 is in a position that causes the float 100 to be held against the cover 116. This causes the arm 103 to lift and closes the fill valve 140 until the rocker switch 106 is placed in the second position thereby releasing the float 100.

Figure 9:
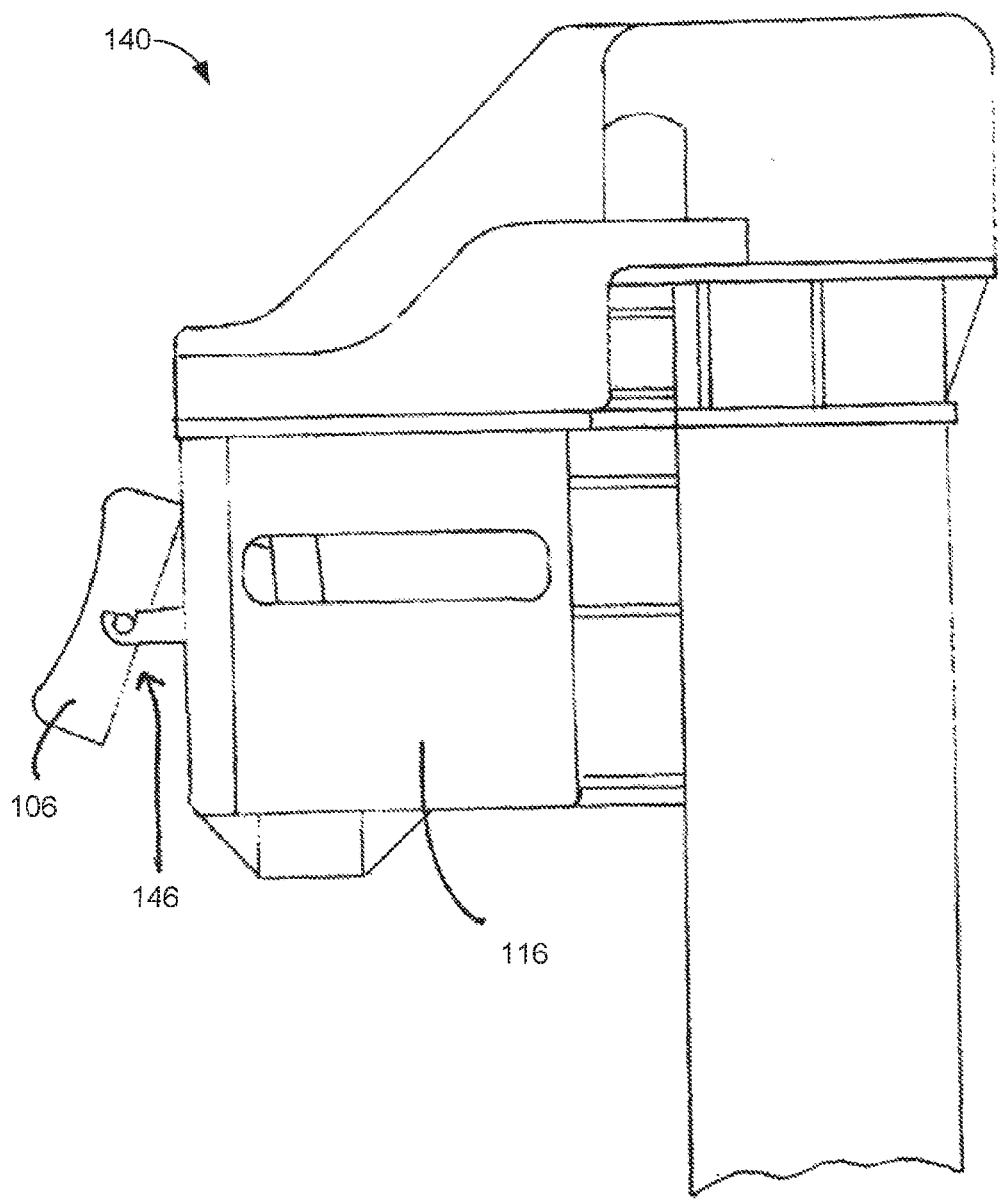

Referring next to FIG. 9, shown is a side view of the fill valve 140 according to an embodiment of the invention in which a pin joint 146 that holds the rocker switch 106 to the cover 116 is illustrated. In addition, it is understood that the rocker switch 106 may be held in such position using any type of pin joint or other types of joints as can be appreciated.

Figure 10:
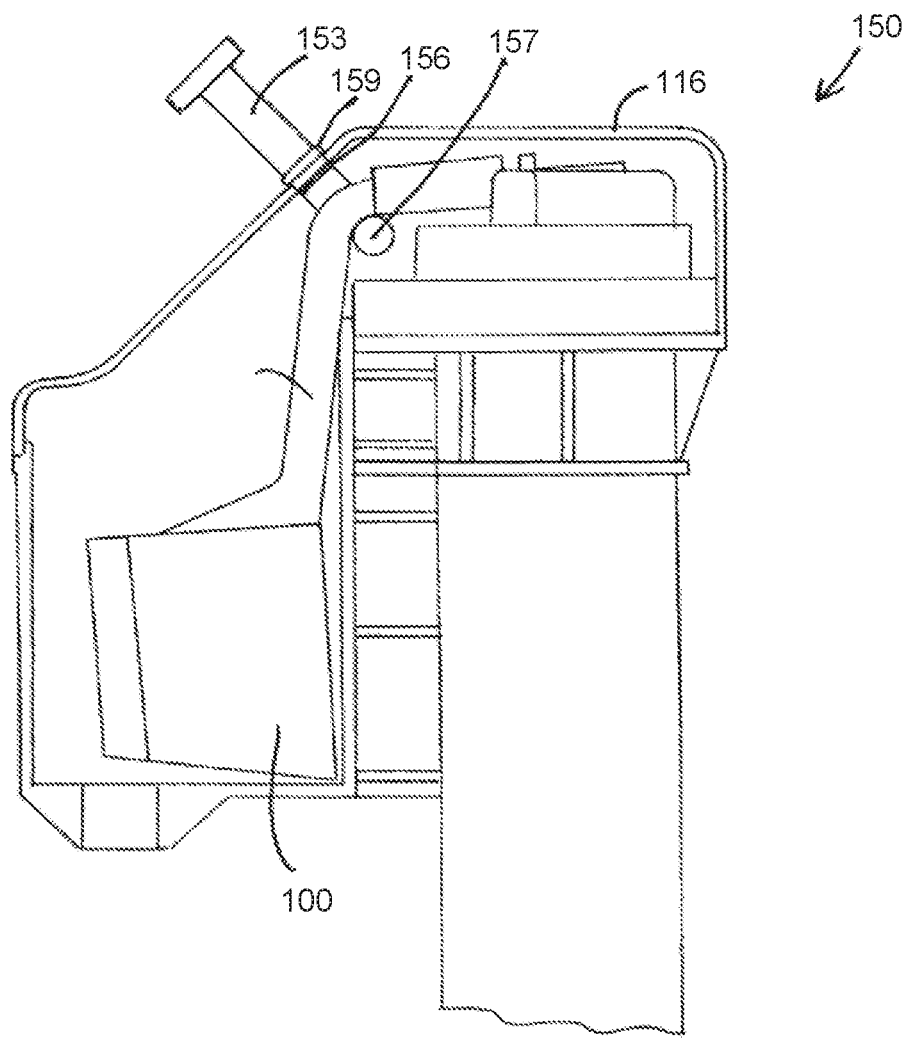
FIGS. 10-16 show various examples of toilet fill valve locking mechanisms employing a push/pull lever according to various embodiments of the present invention.

With reference to FIG. 10, shown is a fill valve 150 with a lock mechanism that comprises a push/pull lever 153. The push/pull lever 153 slides through an opening in the cover 116 of the fill valve 150. The push/pull lever includes a first protrusion 156 that impedes the progress of the push/pull lever 153 through the cover 116, thereby providing two different positions in which the push/pull lever may be placed. The push/pull lever 153 also includes a second protrusion 159 that prevents the push/pull lever 153 from being pushed into the cover too far. At the end of the push/pull lever is a hook 157 that engages a portion of the arm 103. The hook may comprise a single hook such as a J-structure or a T-structure where the push/pull lever extends through an opening in the arm 103, for example. As shown with reference to FIG. 10, the push/pull lever 153 is pressed into the cover 116 up against the protrusion 159. Due to the fact that the push/pull lever is inserted into the cover 116 to the maximum allowable, the hook portion 157 of the push/pull lever 153 does not engage the arm 103 and the fill valve 153 operates normally during various flush cycles of the toilet.

Figure 11:
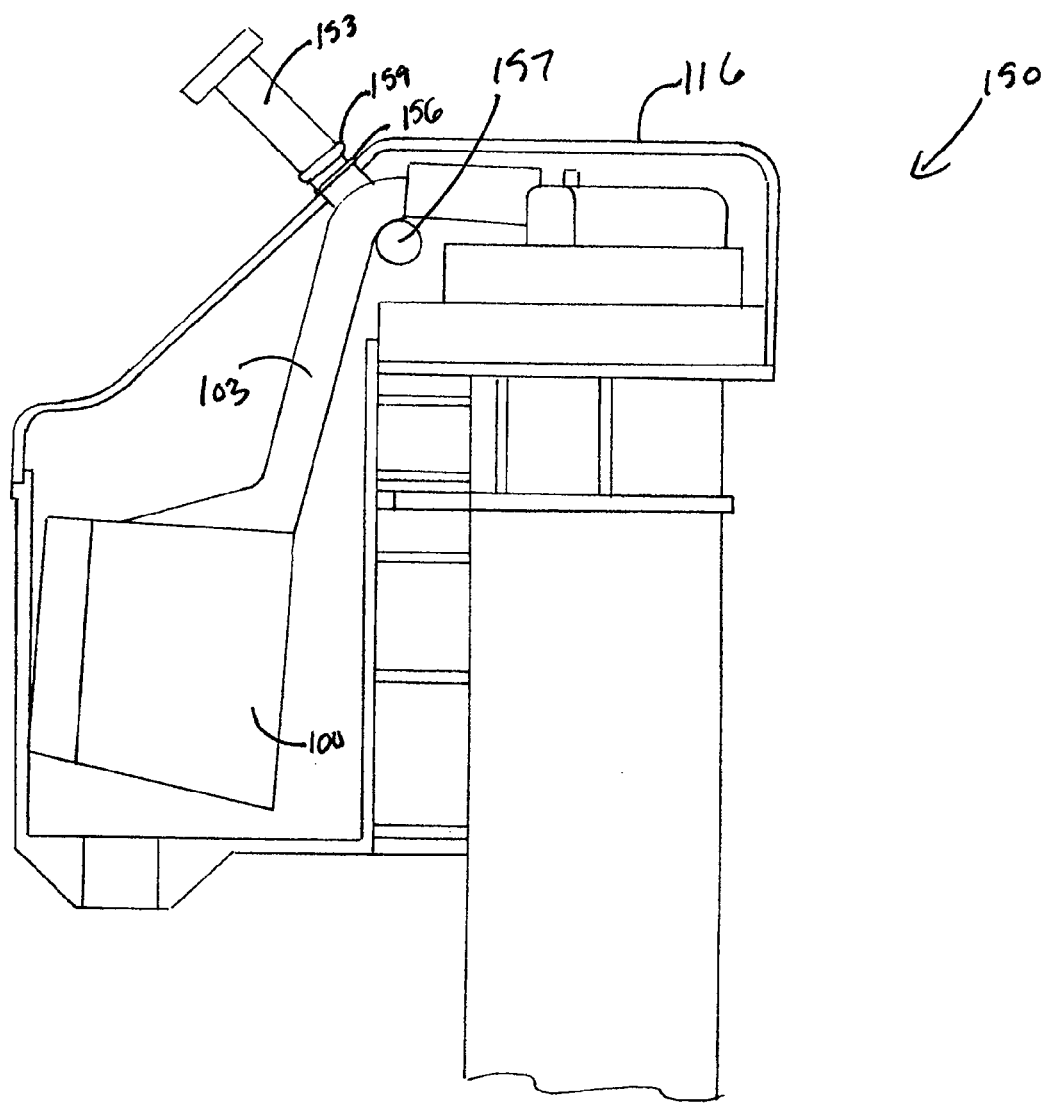

With reference to FIG. 11, shown is the fill valve 150 in which the push/pull lever 153 has been pulled into a second position in which the protrusion 156 is popped through a hole in the cover 116, and due to the friction between the protrusion 156 and the hole, the push/pull lever 153 is held in a second state or position. In this position, the hook 157 engages the arm 103 and pulls it outward to its maximum position, thereby holding the fill valve 150 in a closed state. In this respect, the fill valve 150 will remain in a closed state until the push/pull lever 153 is pressed in and the hook 157 releases the arm 103 in the float 100 for normal operation.

Figure 12:
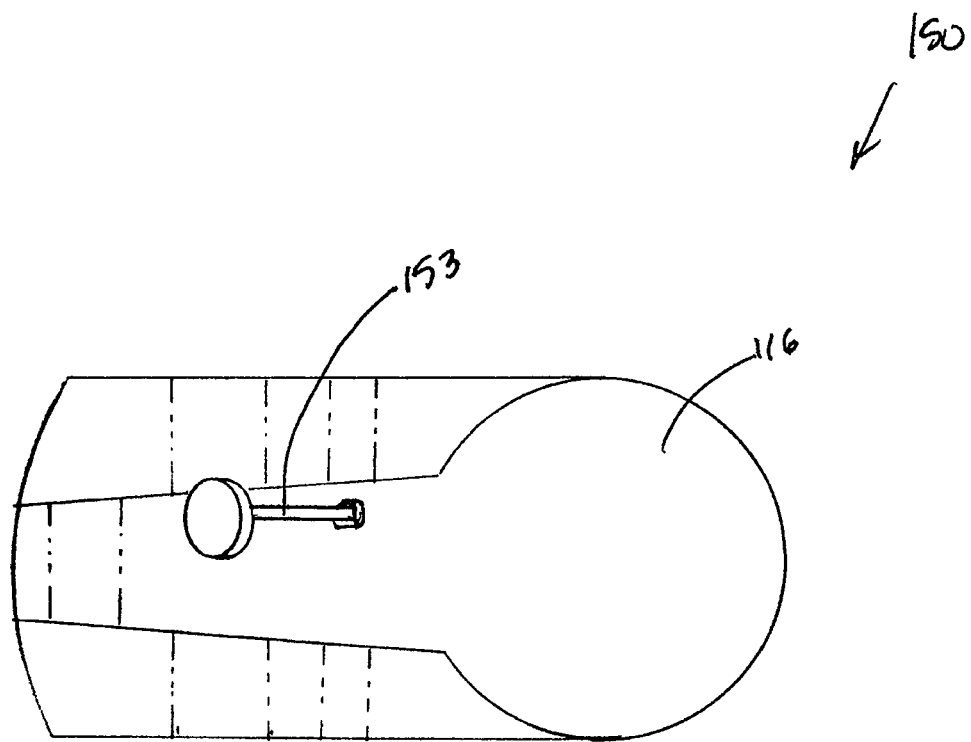
Figure 13:
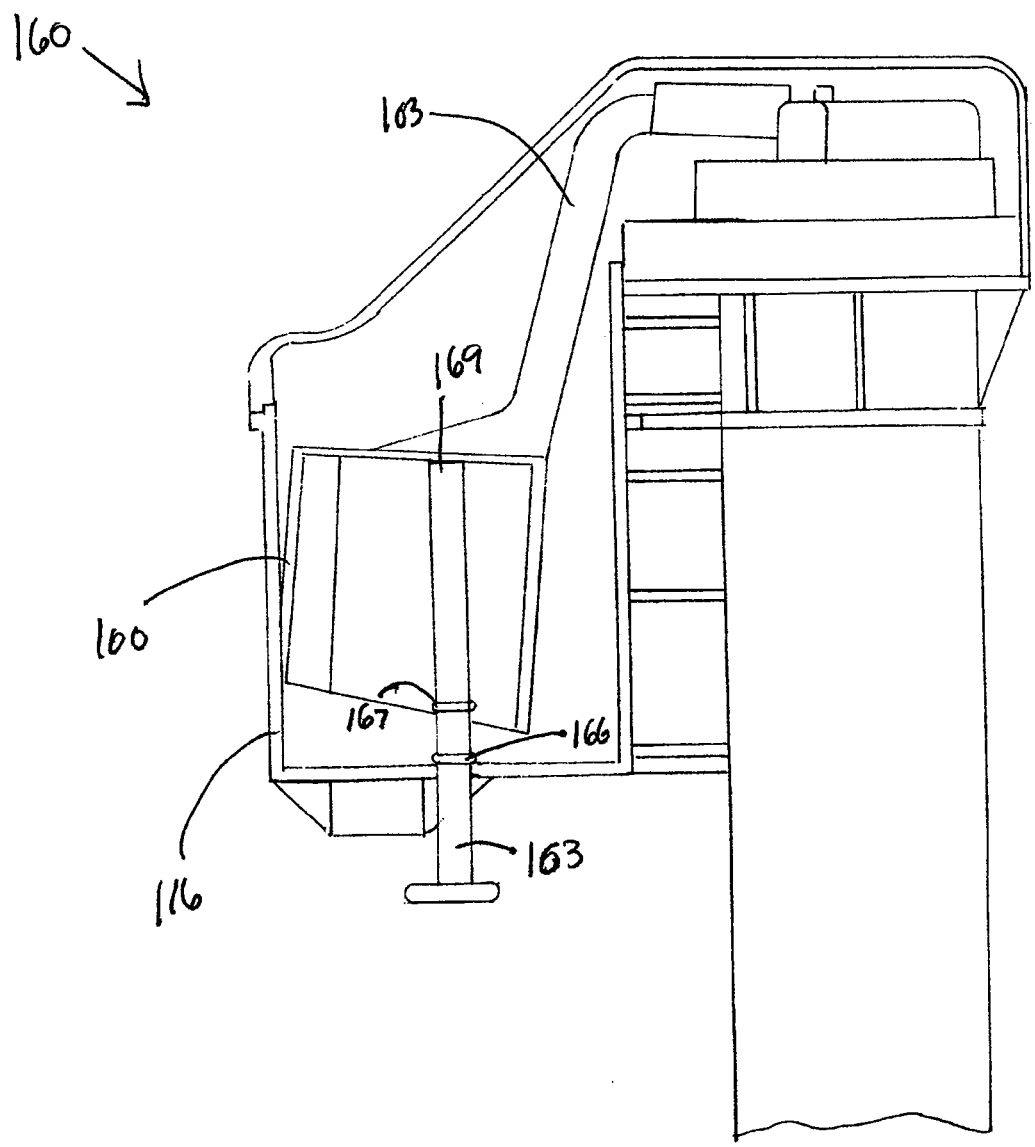
Figure 14:
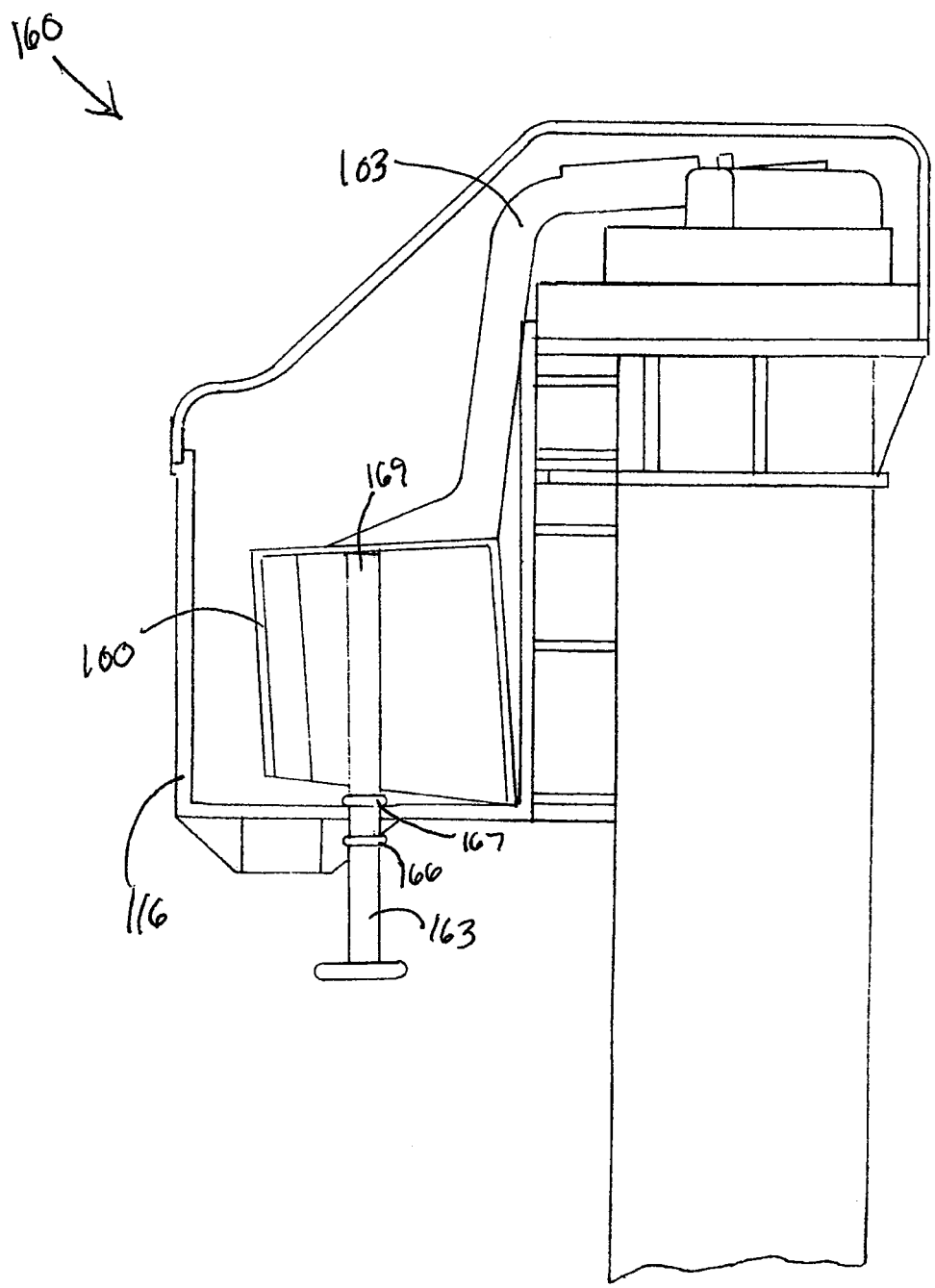

With reference to FIG. 12, shown is one example of a top view of the fill valve 150 that shows the push/pull lever 153 extending through the cover 116. Referring next to FIGS. 13 and 14, shown is a fill valve 160 in which a push/pull lever 163 is employed through a bottom portion of the cover 116. According to an embodiment of the present invention, a push/pull lever 163 includes a first protrusion 166 and a second protrusion 167. The first protrusion 166 facilitates a frictional fit with regard to a hole in the cover 116 and allows the push/pull lever 163 to be pulled in and out of the cover 116 and be placed in first and second positions with respect to the cover 116 and the float 100. The second protrusion 167 prevents a push/pull lever 163 from being pulled out of the hole in the cover 116 when the push/pull lever 163 is in the position depicted with respect to FIG. 14.

In the position of FIG. 13, an end 169 of the push/pull lever 163 is pressed up against an inner top wall of the float 100, thereby forcing the float 100 in an upward position. This causes the arm 103 to be lifted and consequently, the fill valve 160 is maintained in a closed position. With respect to the embodiments as depicted in FIG. 14, the push/pull lever 163 is pulled in a downward position such that the protrusion 166 falls outside the cover 116. Consequently, the end 169 of the push/pull lever 163 does not engage the inner top wall of the float 100 and the float 100 moves freely during normal operation of the fill valve 160.

Figure 15:
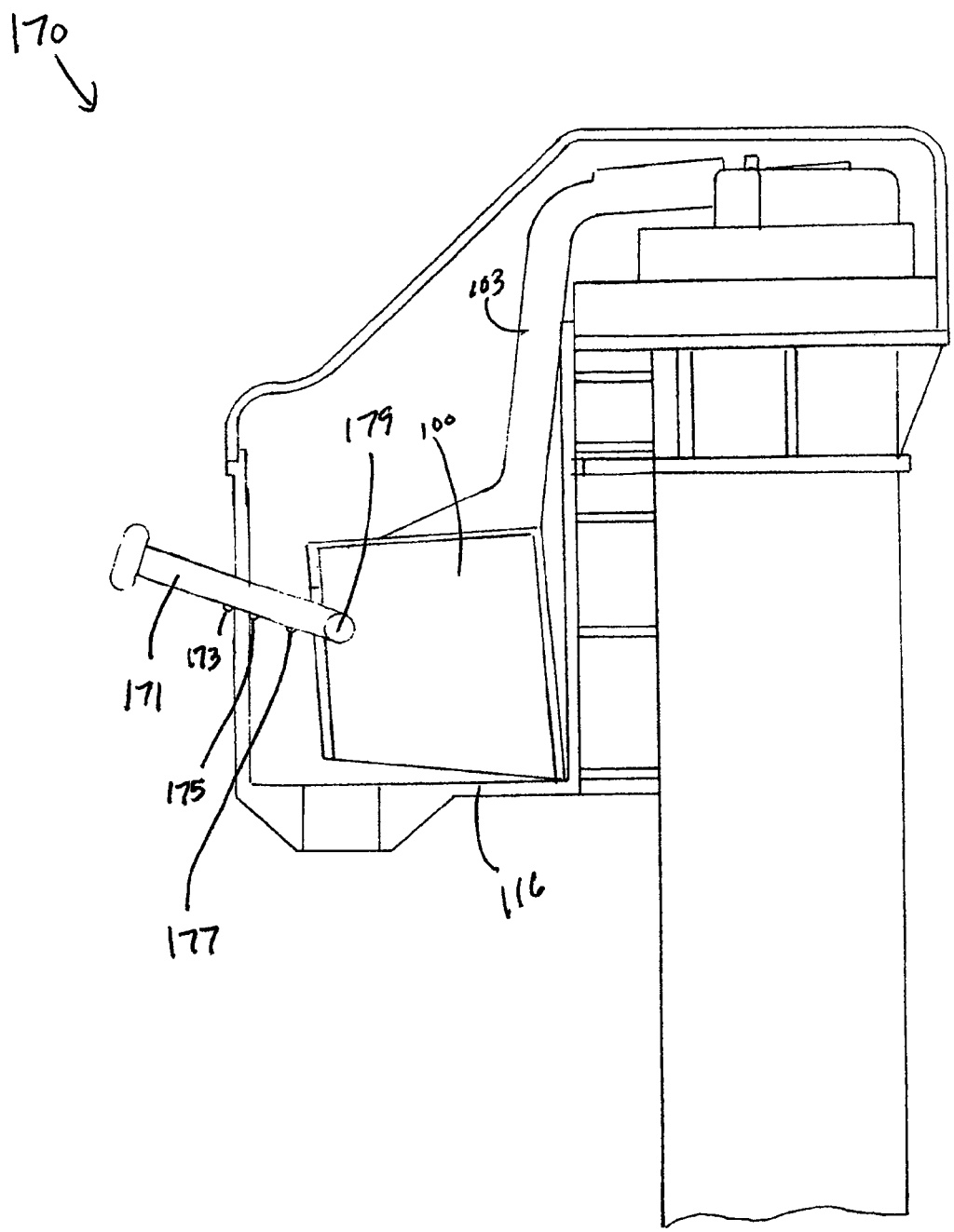
Figure 16:
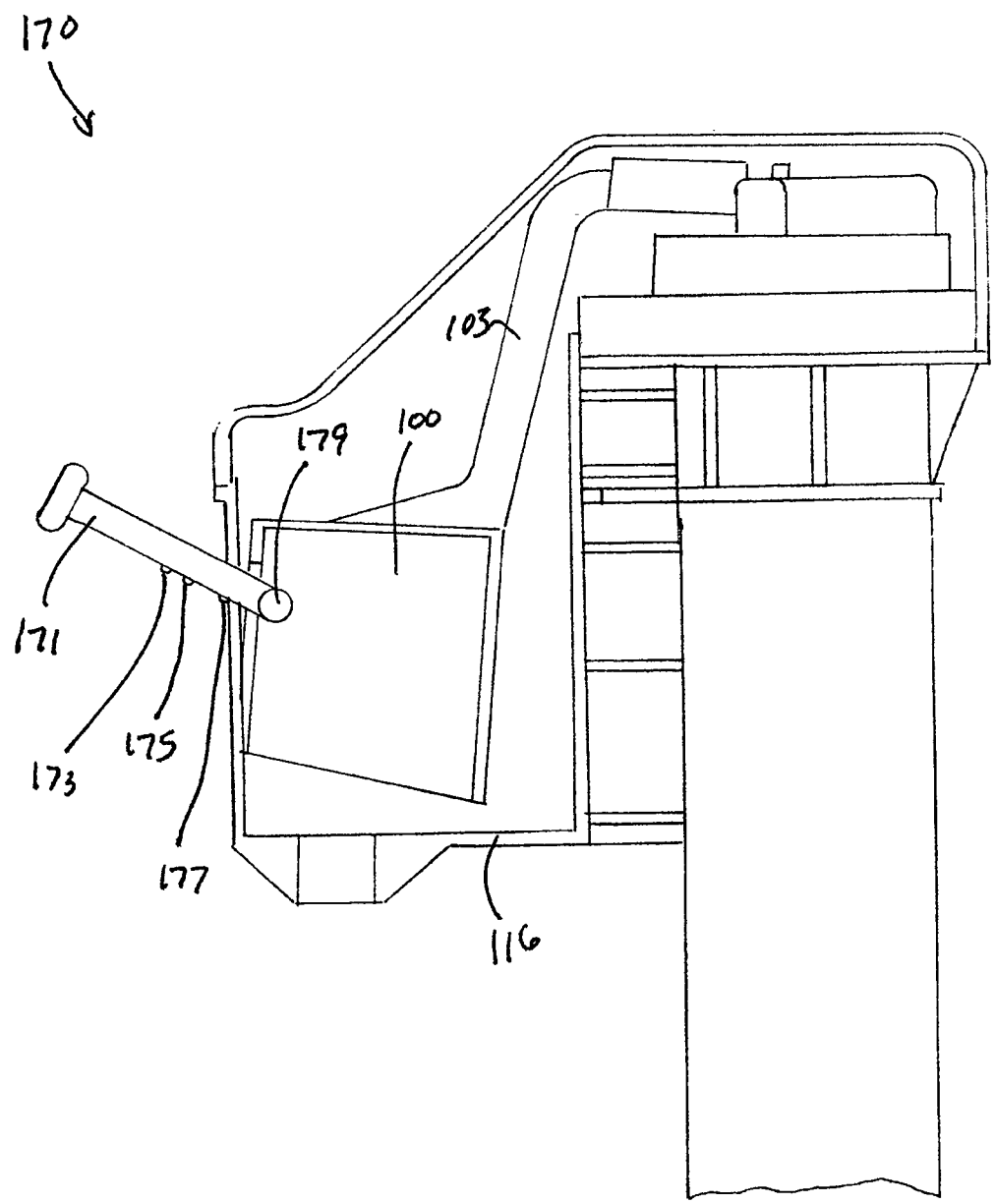

Referring next to FIGS. 15 and 16, shown is a fill valve 170 according to yet another embodiment of the present invention. The fill valve 170 includes a push/pull lever 171 that extends in a side of the cover 116 and engages the float 100. The push/pull lever 171 includes a first protrusion 173, a second protrusion 175, and a third protrusion 177. The first protrusion 173 prevents the push/pull lever 171 from being pushed too far into the cover 116. The second protrusion 175 defines a first position in which the fill valve is maintained in a normal operating state, where the push/pull lever 171 does not engage the float 100. The third protrusion 177 defines a state or position of the push/pull lever 171 when the second protrusion 175 is forced outside of the cover 116. In this situation, a hook portion 179 of the push/pull lever engages a side of the float 100 and pulls the float into a position, whereby the arm 103 is lifted and the fill valve 170 is maintained in a closed state.

Thus, as depicted in FIG. 15, the fill valve 170 is in a normal operating state in which the float 100 moves freely. In FIG. 16, the float is in a second state in which the float 100 is maintained against the cover 116 due to the fact that the push/pull lever 171 is pulled out of the cover up to the third protrusion 177, thereby lifting the arm 103 and maintaining the fill valve 170 in a closed state. In addition, the hole in the side of the float 100 would allow air to escape and thereby impede the normal operation of the float 100. To prevent this, an inner wall is placed around the opening and the hook portion 179 that extends into the float 100 to isolate the hole through the side of the float. Alternatively, the push/pull lever 171 may be located such that the hook 179 extends through a bottom portion of the float 100, thereby allowing an air pocket to be maintained within the float 100.

Figure 17:
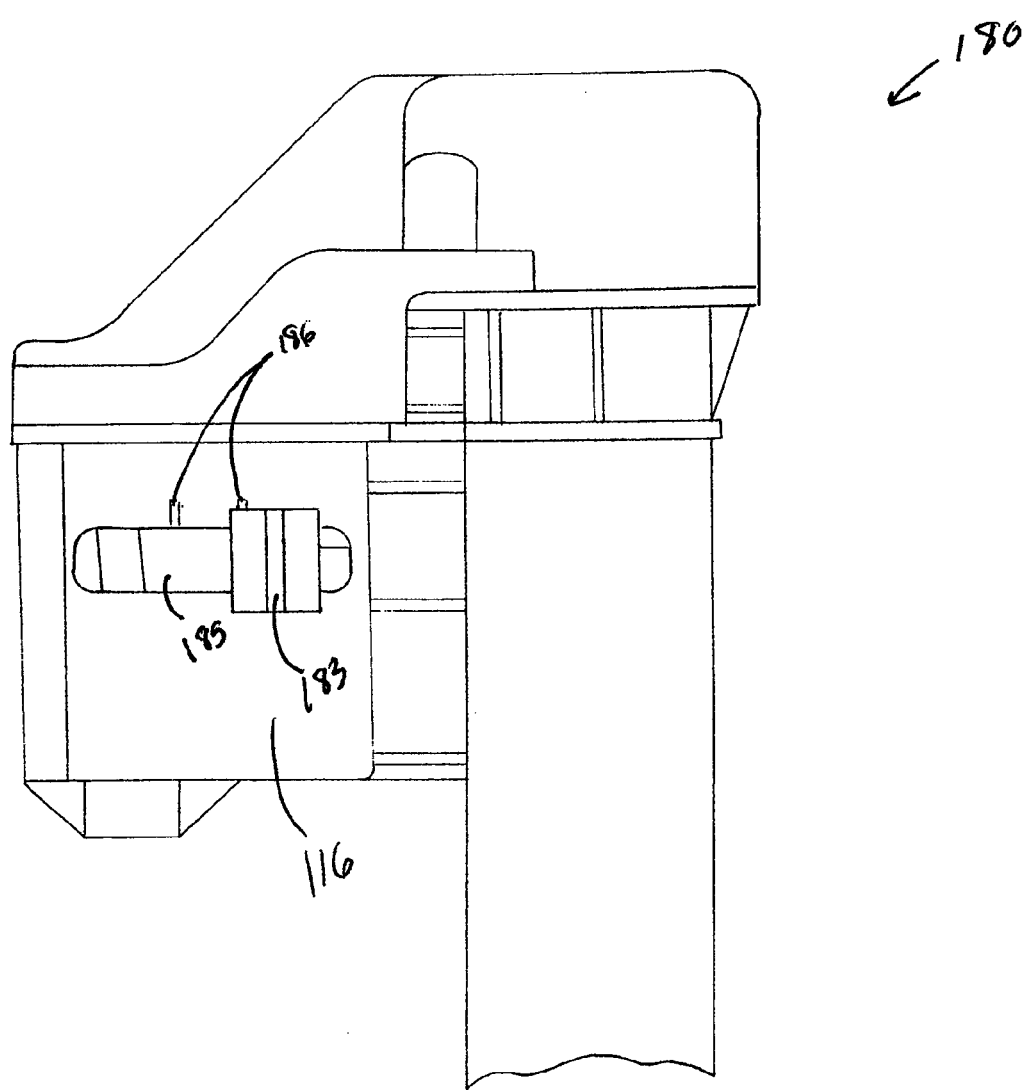
FIGS. 17-19 show various views of a slide locking mechanism in a toilet fill vale according to various embodiments of the present invention.
Figure 18:
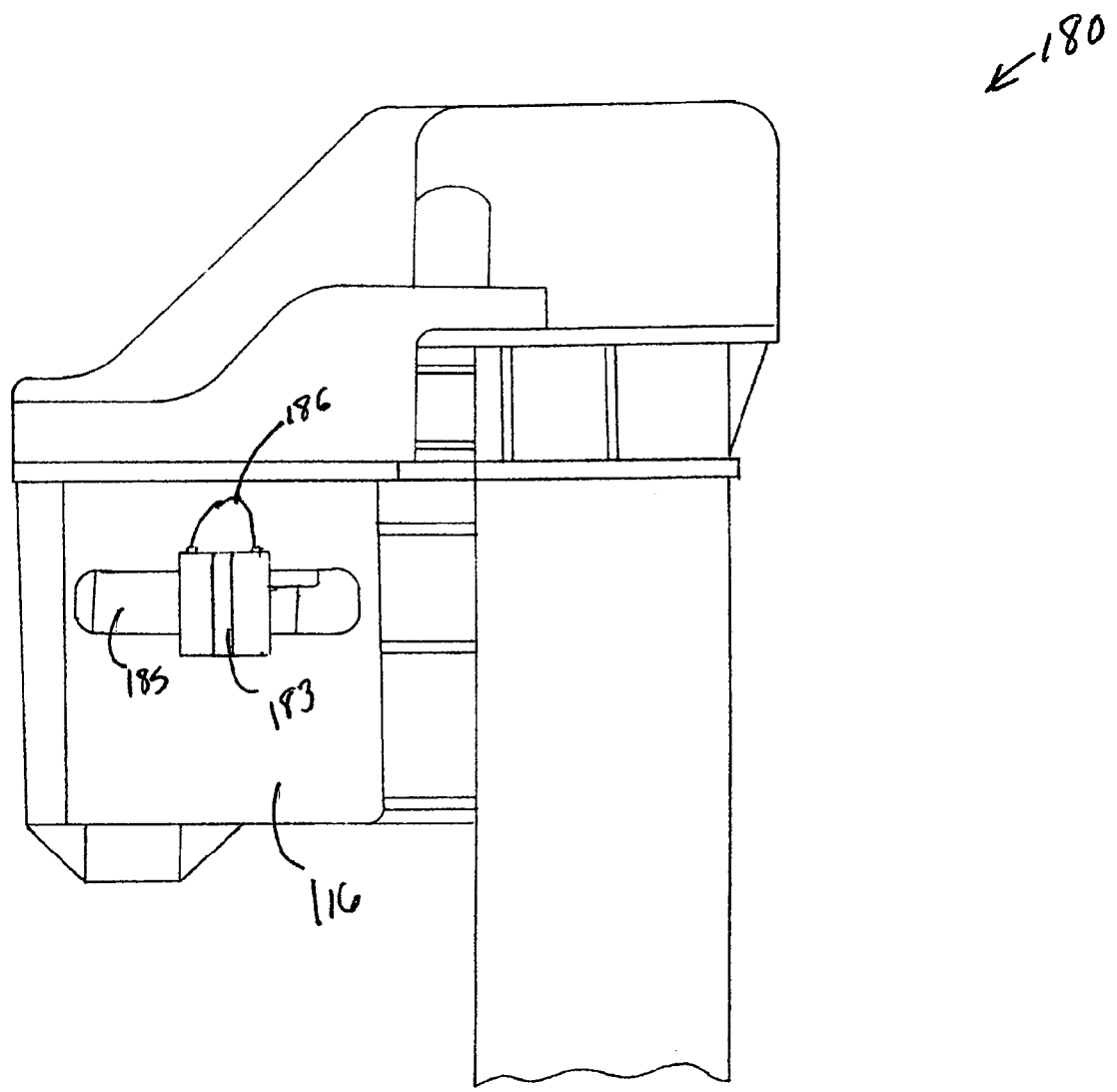
Figure 19:
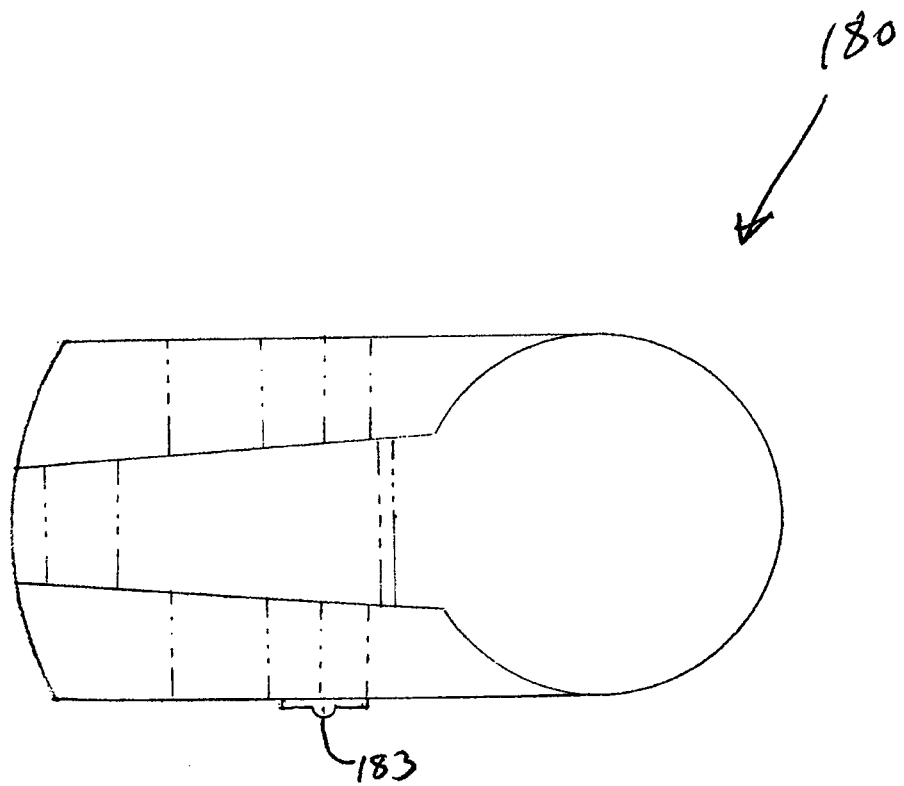

Next, with reference to FIGS. 17, 18, and 19, shown is a fill valve 180 with a slide mechanism 183 that is employed to lock the operation of the fill valve 180 according to an embodiment of the present invention. The slide mechanism 183 moves along a slot 185 and the cover 116 of the fill valve 180. Protrusions 186 provide interference with the movement of the slide mechanism 183 and hold it into one or more positions along the slot 185. The slide mechanism 183 includes protrusions (not shown) that extend inward toward the float 100 and engage a backside of the float when the slide mechanism is positioned away from the stem portion of the fill valve 180. In this respect, the float 100 is forced in an upward position, thereby lifting the arm 103 in an upward position and maintaining the fill valve in a closed state. Alternatively, if the slide mechanism 183 is maintained against an end of the slot 185 as shown in FIG. 17, then the float 100 is able to move freely to facilitate normal operation of the fill valve 180.

With reference to FIG. 19 shown is a top view of the fill valve 180 in which the slide 183 is depicted on the side.

Figure 20:
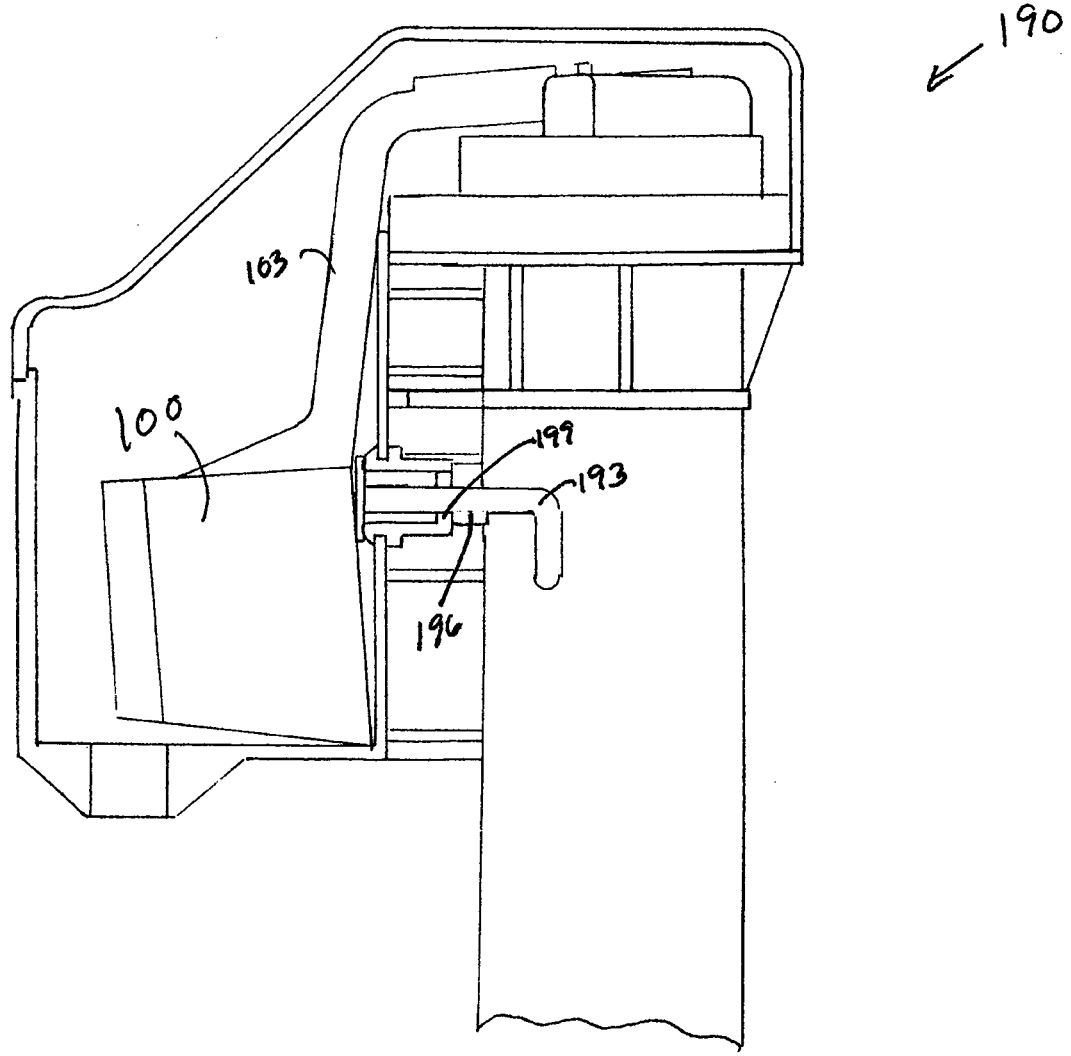
FIGS. 20-21 show various views of a shuttle switch locking mechanism in a toilet fill vale according to various embodiments of the present invention.
Figure 21:
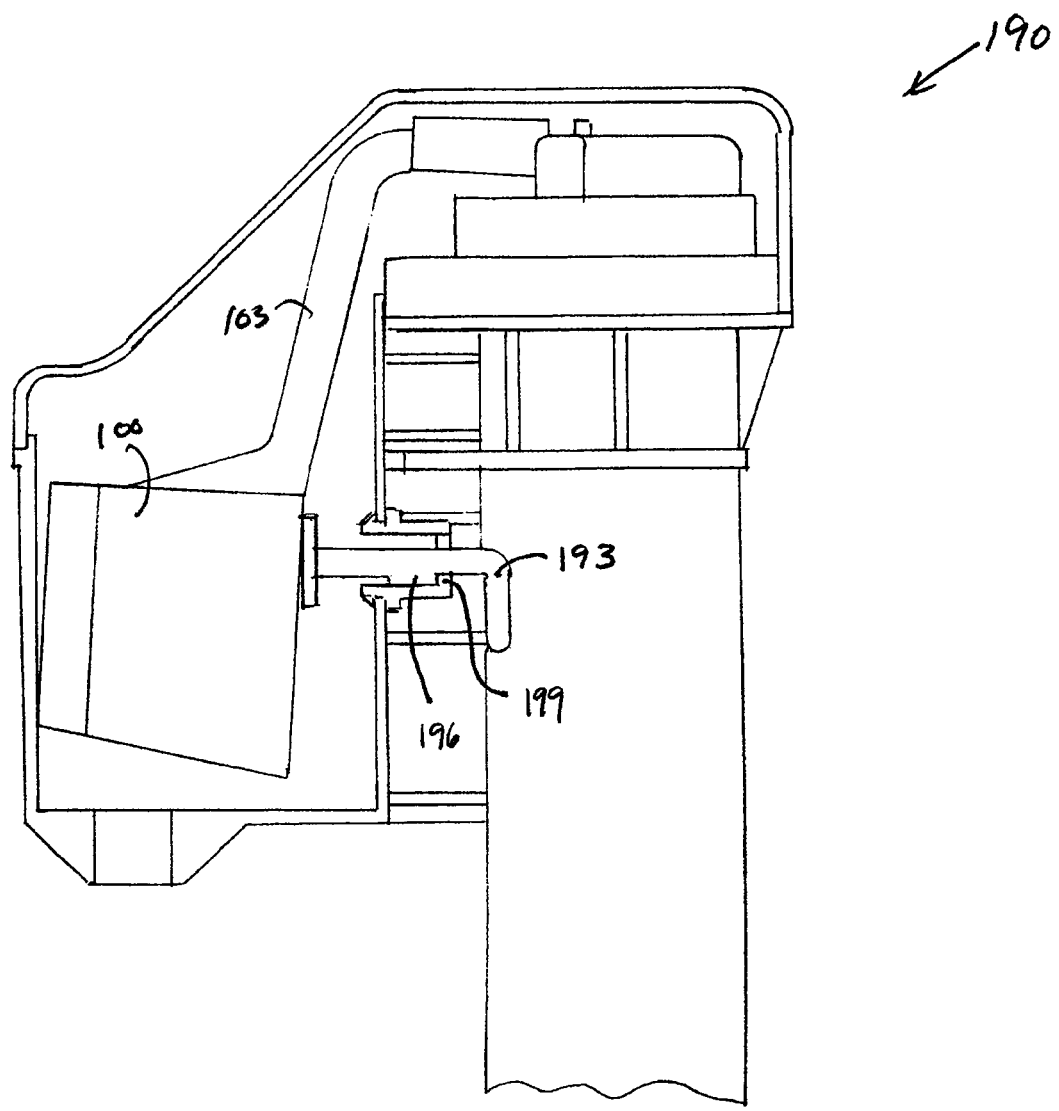

Turning then to FIGS. 20 and 21, shown is a fill valve 190 according to an embodiment of the present invention. The fill valve 190 includes a shuttle switch 193 that engages a back portion of the float 100. The shuttle switch 193 includes a protrusion 196 that may be abutted against either side of a stop 199, thereby allowing the shuttle switch 193 to be placed in a first and second position. In order to move the shuttle switch 193 in the first and second positions, the shuttle switch 193 is simply lifted so that the protrusion 196 is above the stop 199 and the shuttle switch 193 may be moved in either direction along a longitudinal axis of the shuttle switch 193. The shuttle switch is prevented from being pulled out of the fill valve 190 by virtue of an extension as shown.

When the shuttle switch 193 is placed in a first position as shown in FIG. 20, the float 100 is able to move freely to facilitate normal operation of the fill valve 190. However, with respect to FIG. 21, if the shuttle switch 193 is placed in the second position in which the protrusion 196 is on the inside of the stop 199, then the float 100 is pressed forward and in an upward position and the arm 103 is raised correspondingly, thereby maintaining the fill valve 190 in a closed state. While the shuttle switch 193 is shown as engaging the float 100, it is understood that the shuttle switch 193 may be positioned so as to engage the arm 103.

Figure 22:
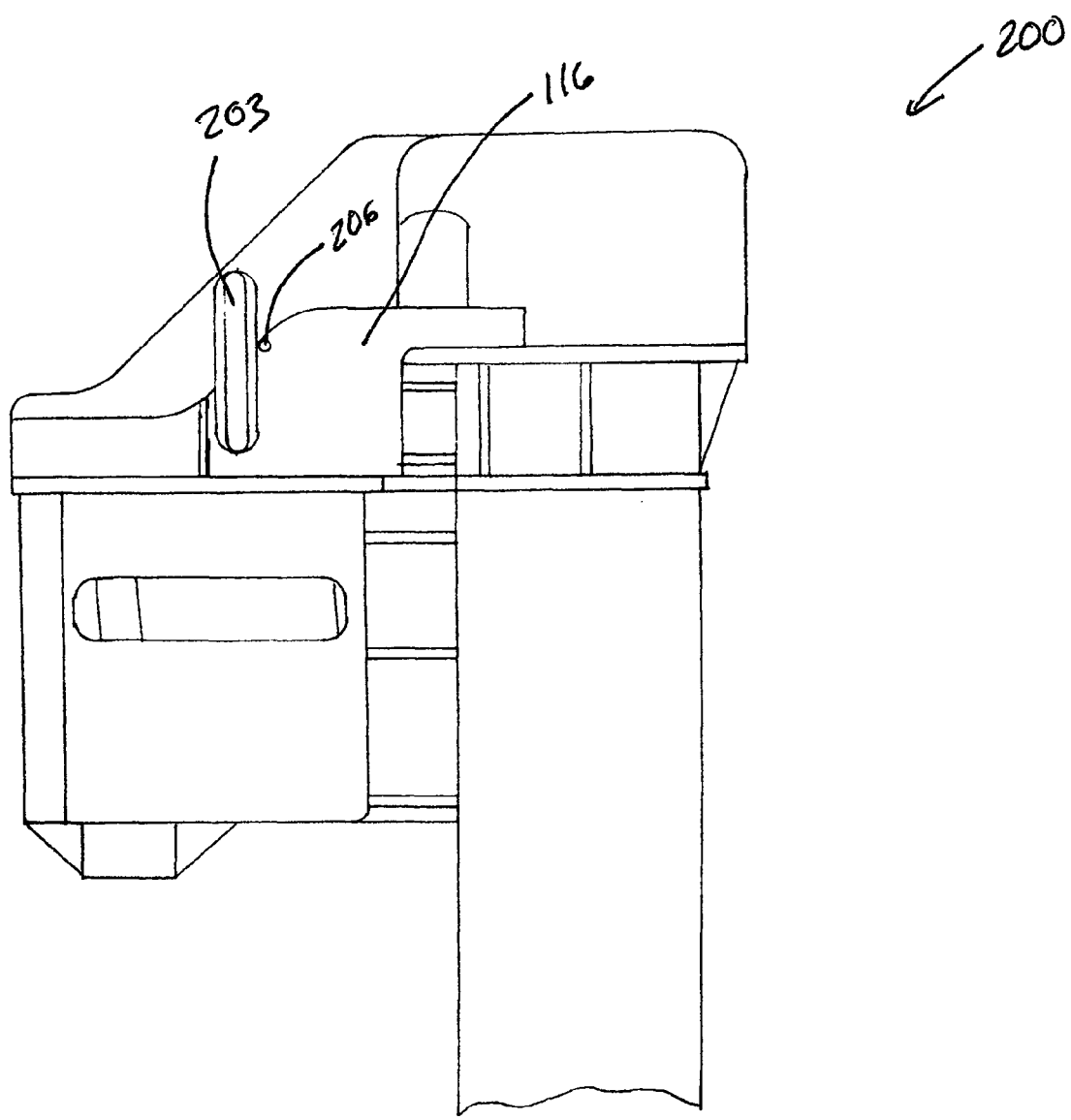
FIGS. 22-30 show various examples of side lever toilet fill valve locking mechanisms according to various embodiments of the present invention.

Referring next to FIGS. 22, 23, 24, 25, and 26, shown is a fill valve 200 according to another embodiment of the present invention that employs a side lever 203. As depicted in FIG. 22, the side lever 203 may be placed in a first position that abuts a protrusion 206 extending from the cover 116 of the fill valve 200.

Figure 23:
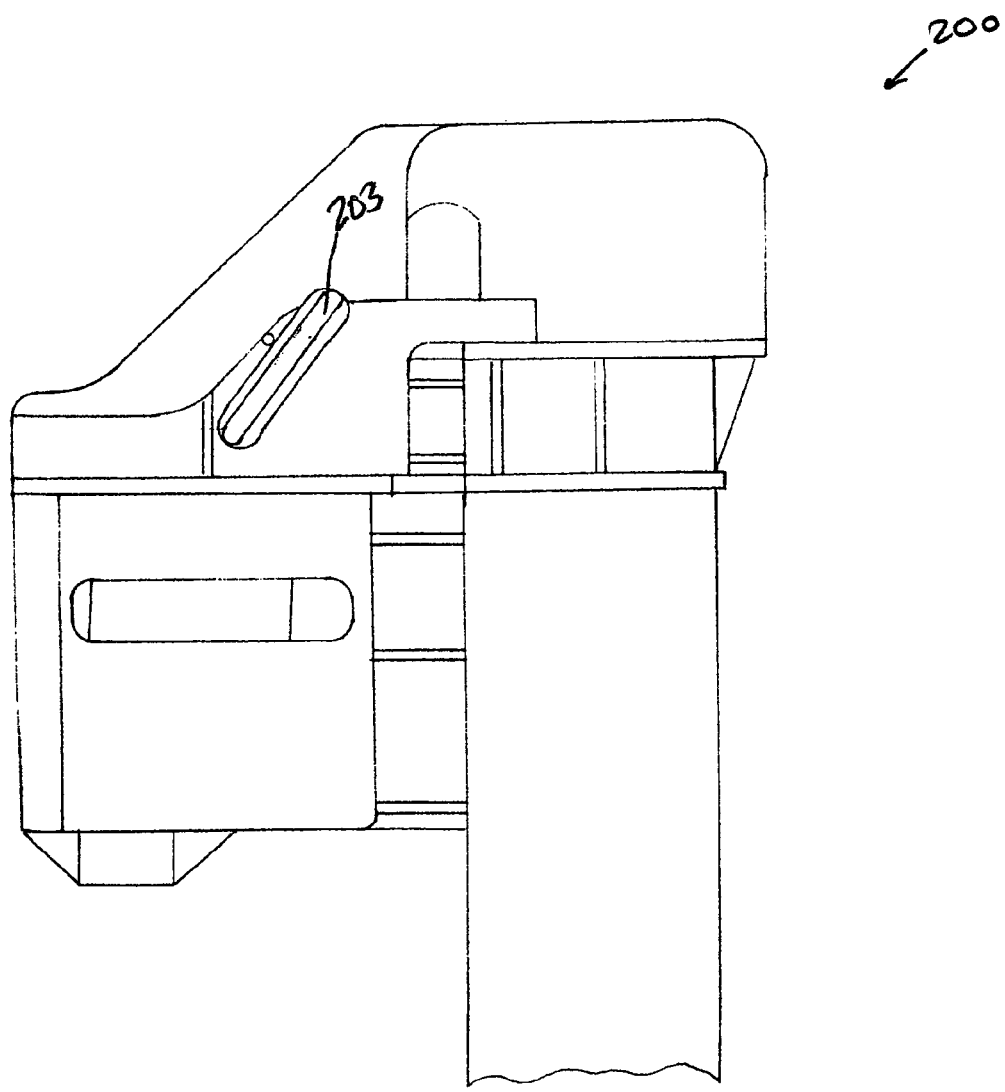

With reference to FIG. 23, the side lever 203 is located in a second position relative to the protrusion 206. In this respect, the protrusion 206 impedes the progress of the side lever 203 from the first position to a second position, thereby holding the side lever 203 in either position.

Figure 24:
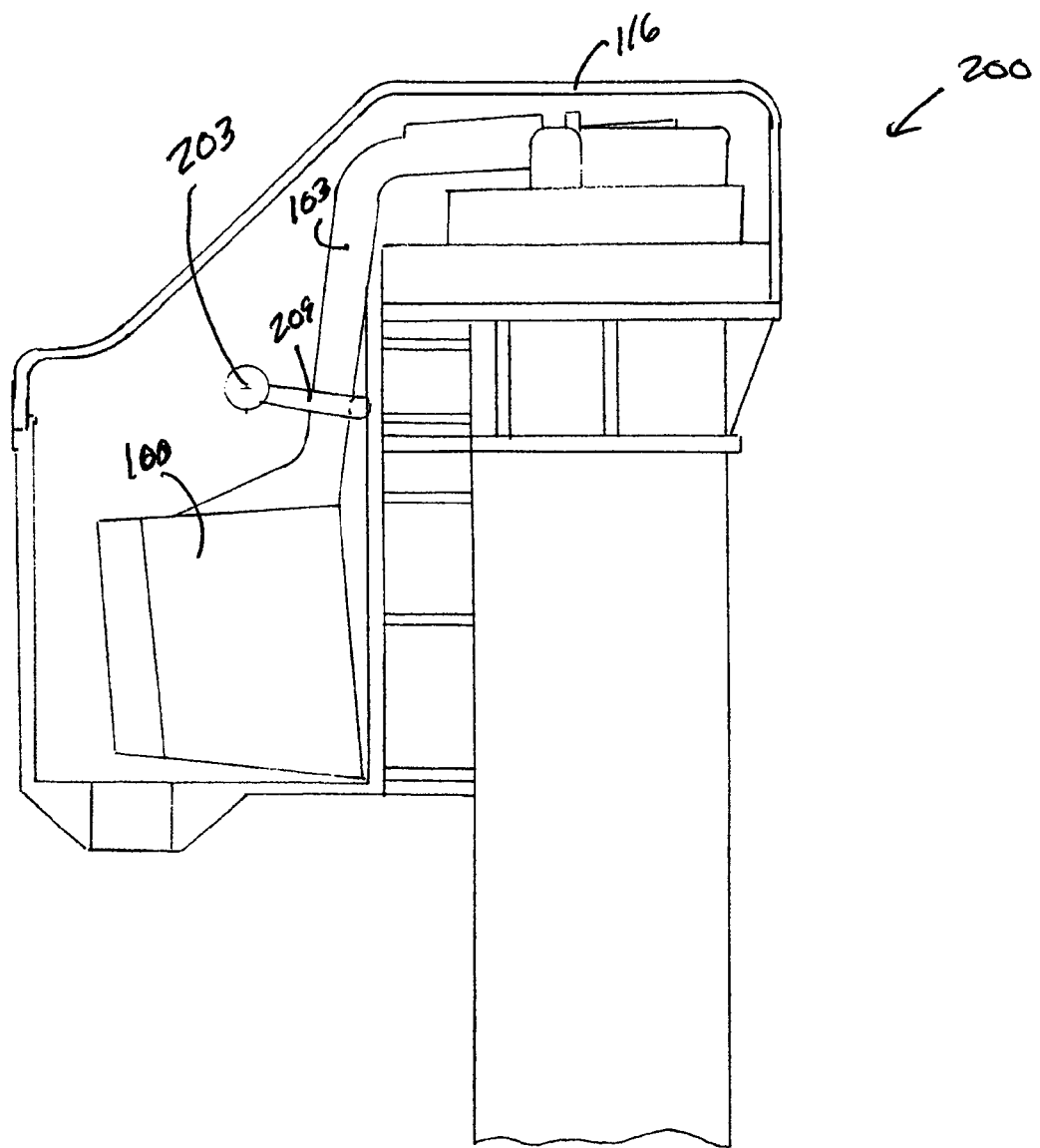

With reference to FIG. 24, shown is a cut away view of the fill valve 200 in which an axis of the side lever 203 extends into the cover 116. A hook 209 extends from the axis of the side lever 203 and engages a back portion of the arm 103. When the side lever is in the first position, the hook 209 is located in the position depicted in FIG. 24 in which the arm 103 is able to move freely facilitating normal operation of the fill valve 200.

Figure 25:
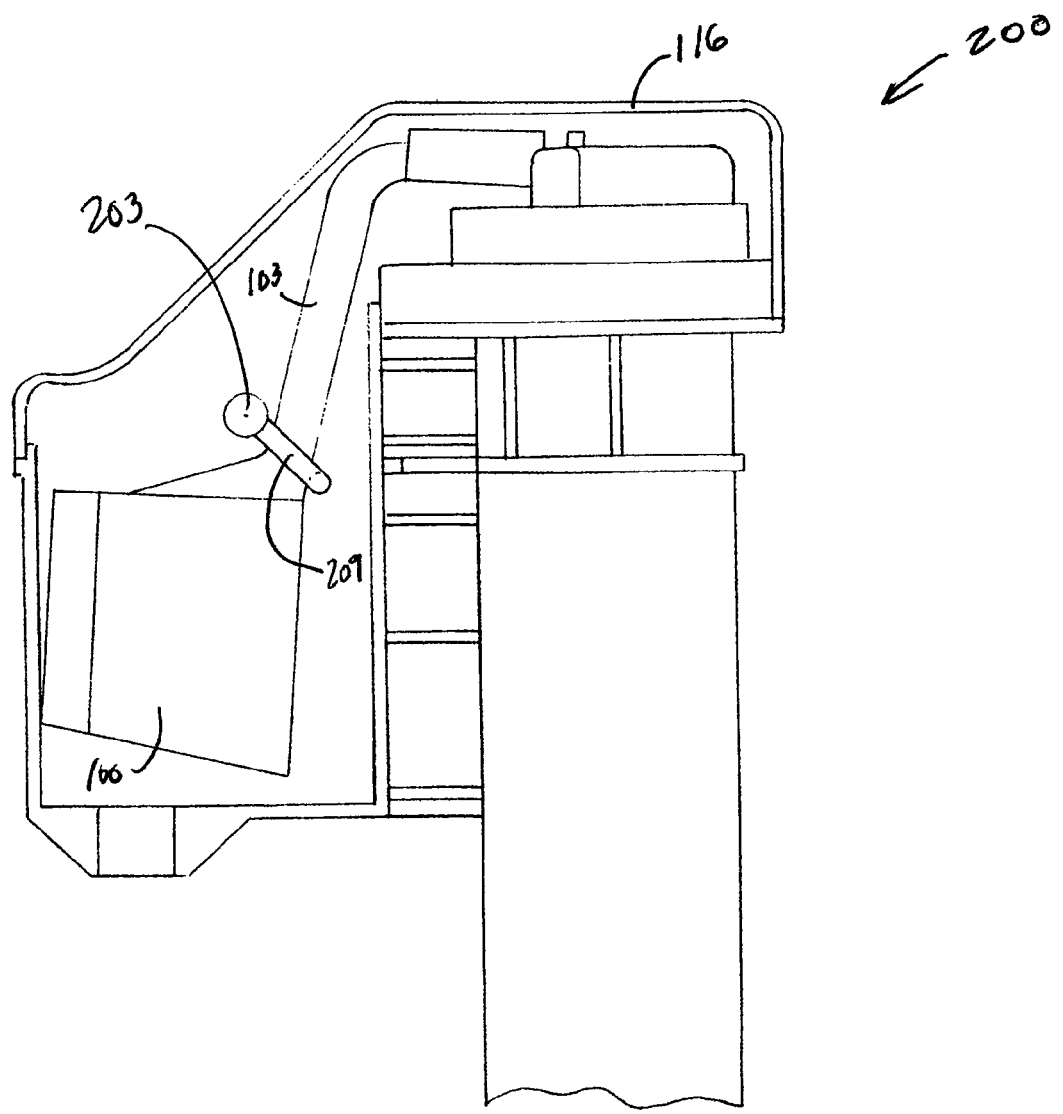

With respect to FIG. 25, when the side lever 203 is in a second position as depicted in FIG. 23, the hook 209 is rotated when the axis of the side lever 203 is rotated correspondingly and the hook 209 engages the arm 103, pushing the arm 103 outward and upward. As a consequence, the fill valve 200 is placed in a closed state as can be appreciated.

Figure 26:
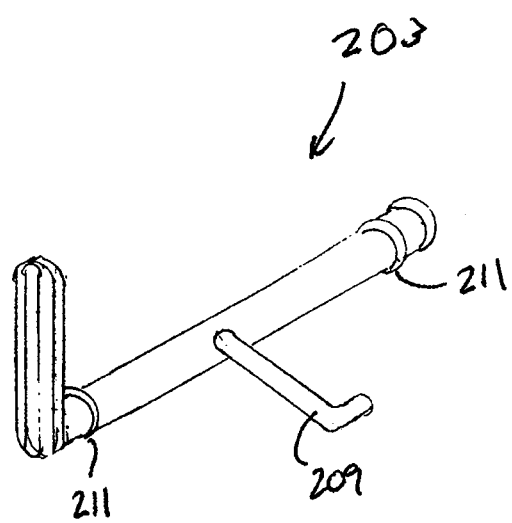

With reference to FIG. 26, shown is a full view of the side lever 203 according to an embodiment of the present invention. As shown, the side lever includes protrusions 211 that allow the side lever to be seated properly in the cover 116 that holds it in place. Also, the hook 209 is shown extending from the axis of the side lever 203. While the side lever 203 is depicted as engaging the arm 103 as shown in the above embodiments, it is understood that the side lever may also engage the float 100 or may engage the arm 103 at any position along the arm 103. In this respect, the cover 116 or other structure is provided to facilitate the positioning of the side lever 203 as can be appreciated.

With reference to FIGS. 27, 28, 29, and 30, shown is a fill valve 220 according to another embodiment of the present invention. The fill valve 220 employs a side lever 223 in a similar manner with the embodiment discussed above with the side lever 203 to engage the float 100 as will be described.

Figure 27:
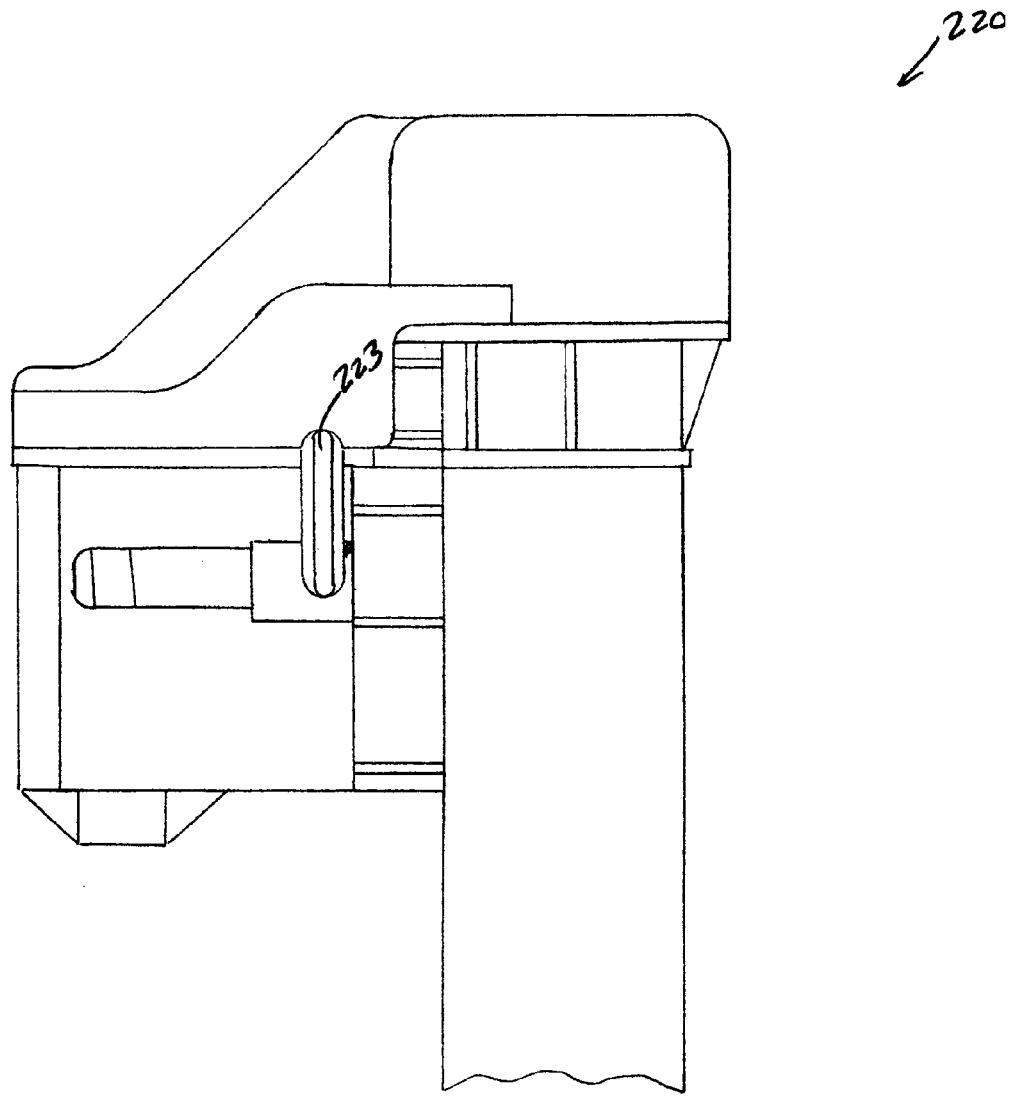
Figure 28:
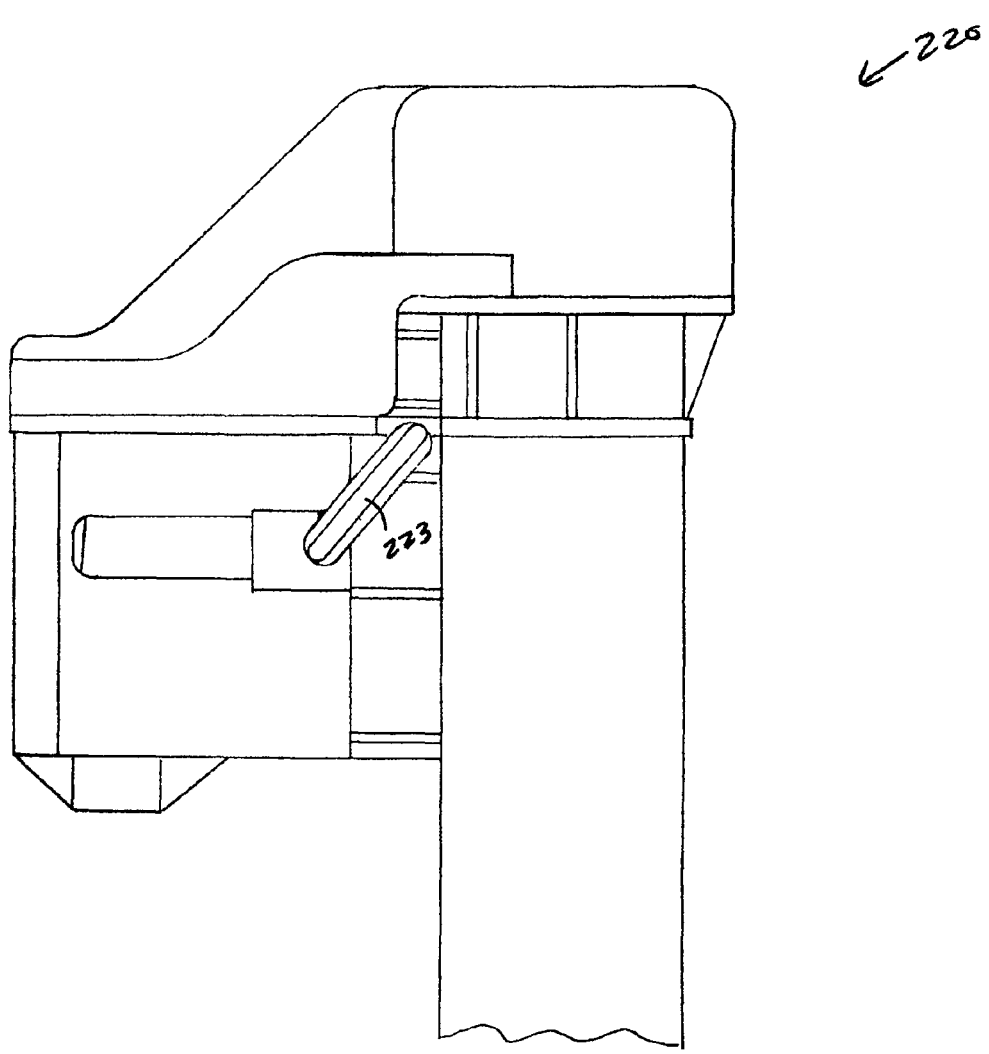

Specifically, in FIG. 27, the side lever 223 shown in the first position in which the fill valve 220 is maintained in a normal operating state. In FIG. 28 the side lever 223 is shown in a second position in which the fill valve is maintained in a closed state. The side lever 223 may be held in either position by a protrusion that extends from the cover as was described above with respect to the side lever 223. Alternatively, a protrusion may extend from the side lever 223 that engages a notch or dip in the cover of the fill valve 220.

Figure 29:
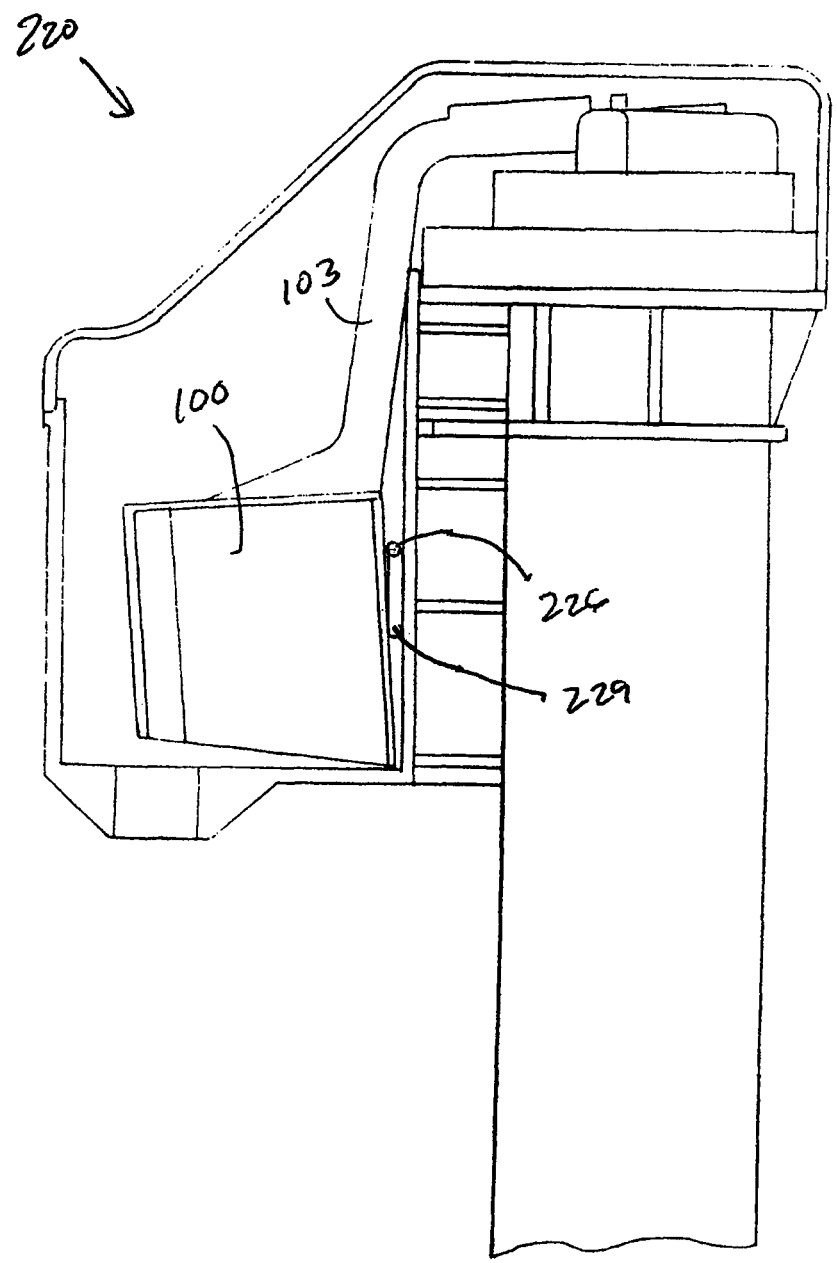
Figure 30:
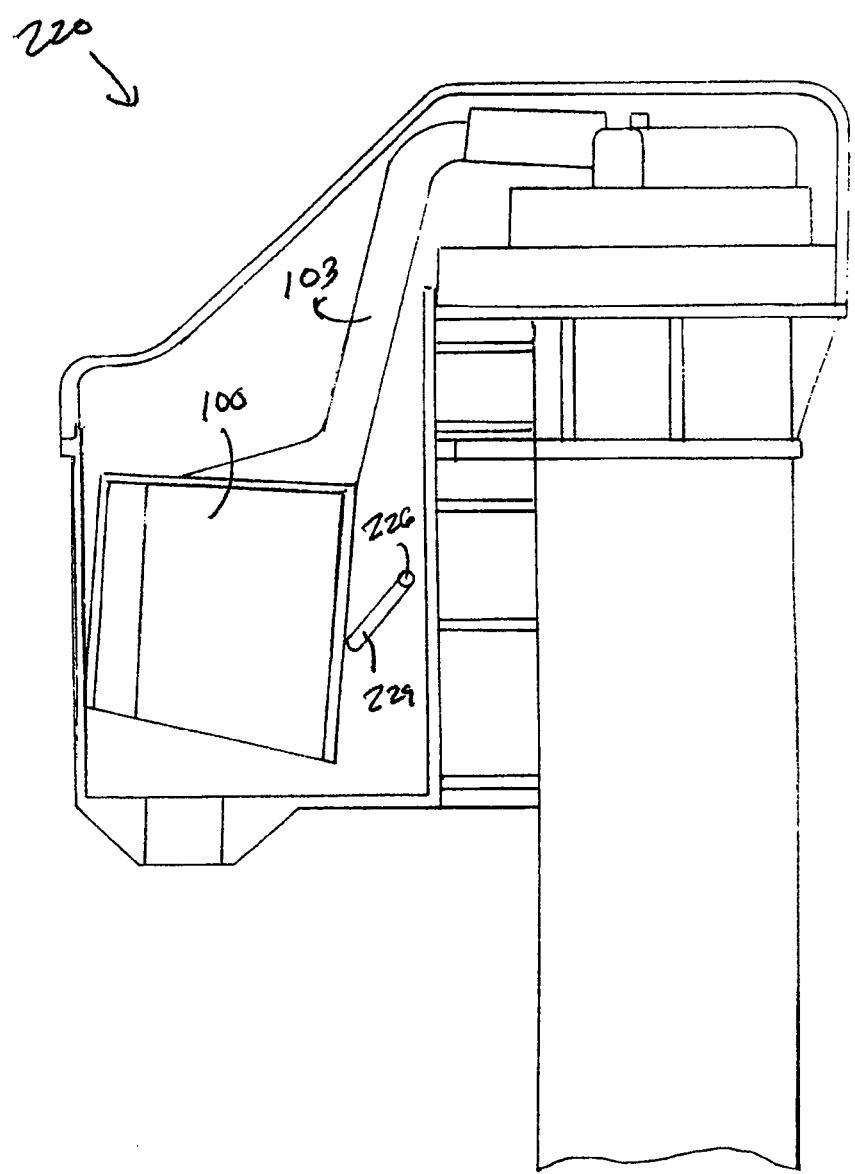

With reference to FIG. 29, shown is an axis 226 extending from the side lever 223. A finger 229 extends orthogonally from the axis 226. As shown in FIG. 29, the finger 229 is positioned in a manner corresponding to the position of the side lever 223 as depicted in FIG. 27. In this situation, the float 100 and the arm 103 are free to move during the normal course of operation of the fill valve 220. With respect to FIG. 29, the finger 229 engages a back wall of the float 100 and moves the float 100 forward and upward. This motion causes the corresponding upward motion of the arm 103 that closes the fill valve 220. In this respect, the position of the finger 229 corresponds with the position of the side lever 223 as depicted with respect to FIG. 28.

Referring next to FIGS. 31, 32, 33, and 34, shown is a fill valve 230 according to another embodiment of the present invention. The fill valve 230 employs a push/pull cam 233 in order to impede the movement of the arm 103 and the float 100 in order to place the fill valve 230 in a closed state or in an operational state as will be described. The push/pull cam 233 comprises a rod 236 and a cam portion 239. When the push/pull cam 233 is pulled out of the cover 116 to the extent possible, the cam portion 239 is moved away from the arm 103, and the arm 103 can move freely throughout its entire range of motion, thereby allowing the fill valve 230 to operate in the normal manner.

Figure 32:
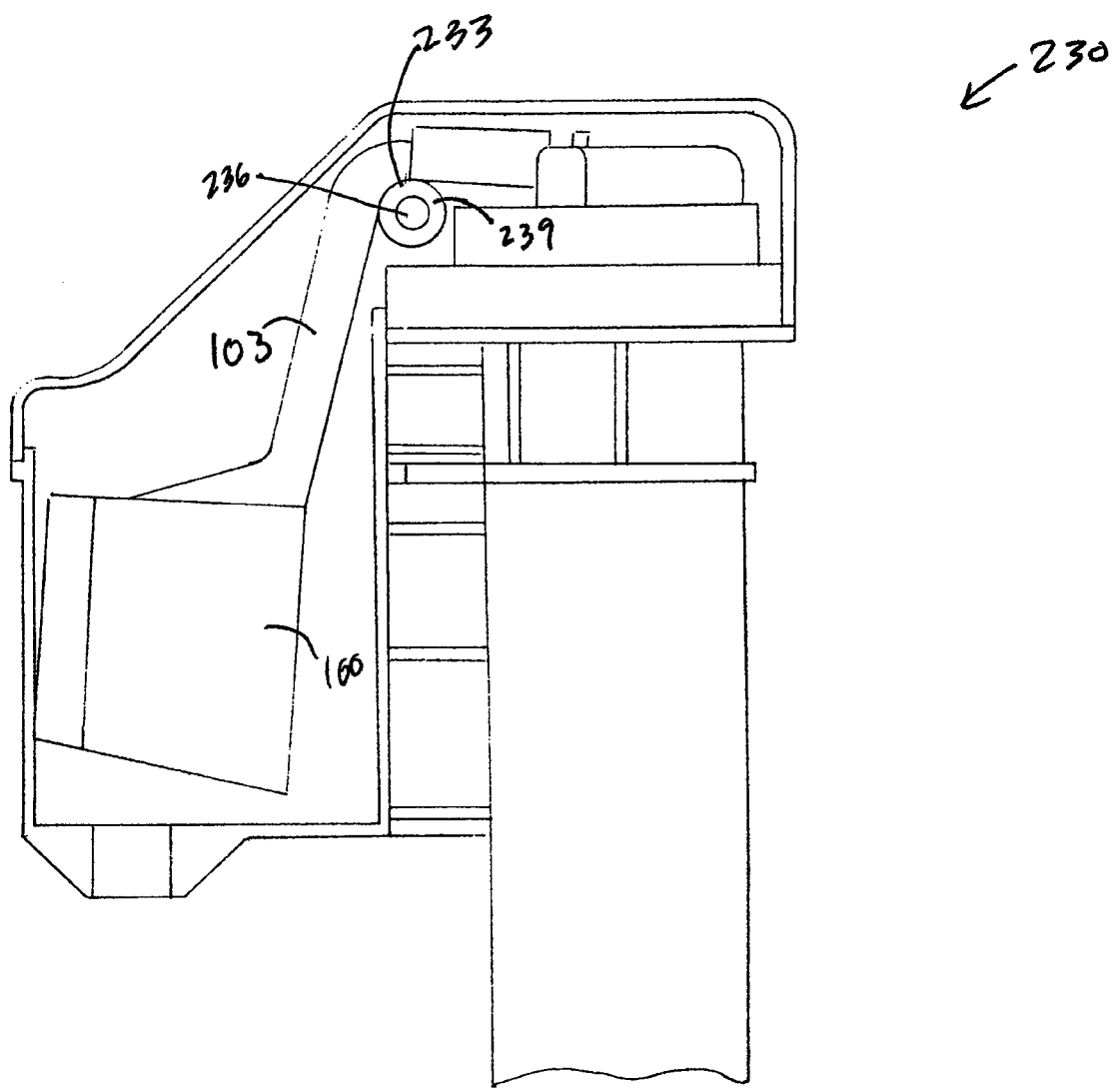

With reference to FIG. 32, once the push/pull cam 233 is pressed into the cover of the fill valve 230, then the cam portion 239 engages the arm 103, holding the arm 103 upward and maintaining the fill valve 230 in a closed state.

Figure 31:
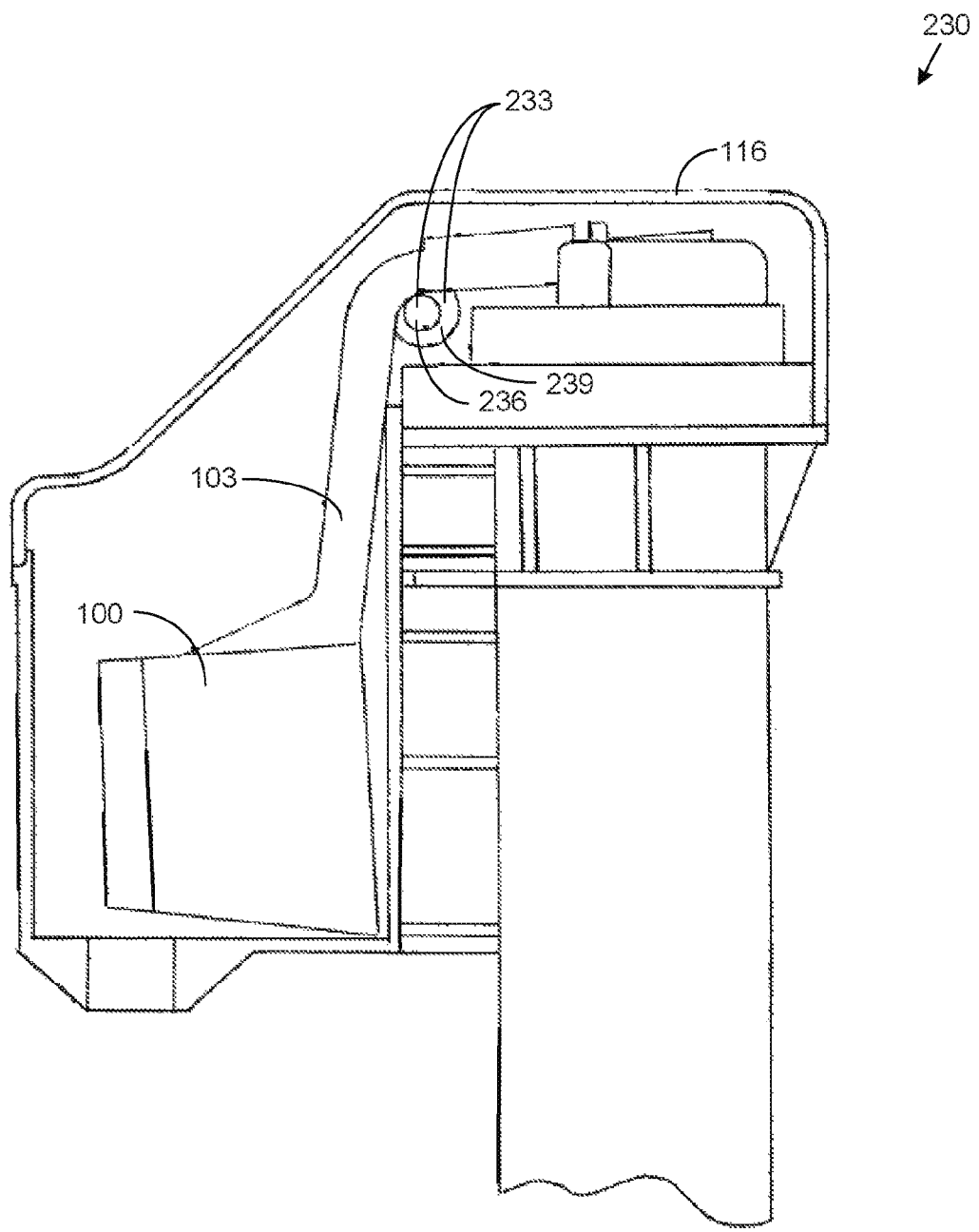
FIGS. 31-34 show various views of a push/pull cam locking mechanism in a toilet fill vale according to various embodiments of the present invention.
Figure 33:
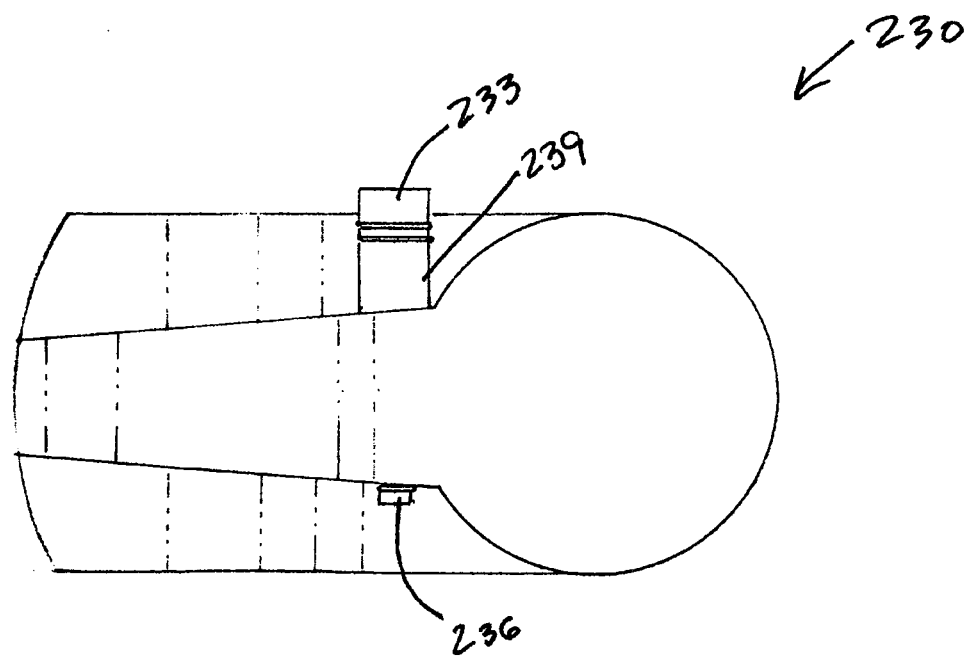

With reference to FIG. 33, shown is a top view of the fill valve 230 that depicts the push/pull cam 233 in the position corresponding to the view depicted in FIG. 31 in which the push/pull cam is not completely compressed into the fill valve and the fill valve 230 operates in a normal manner.

Figure 34:
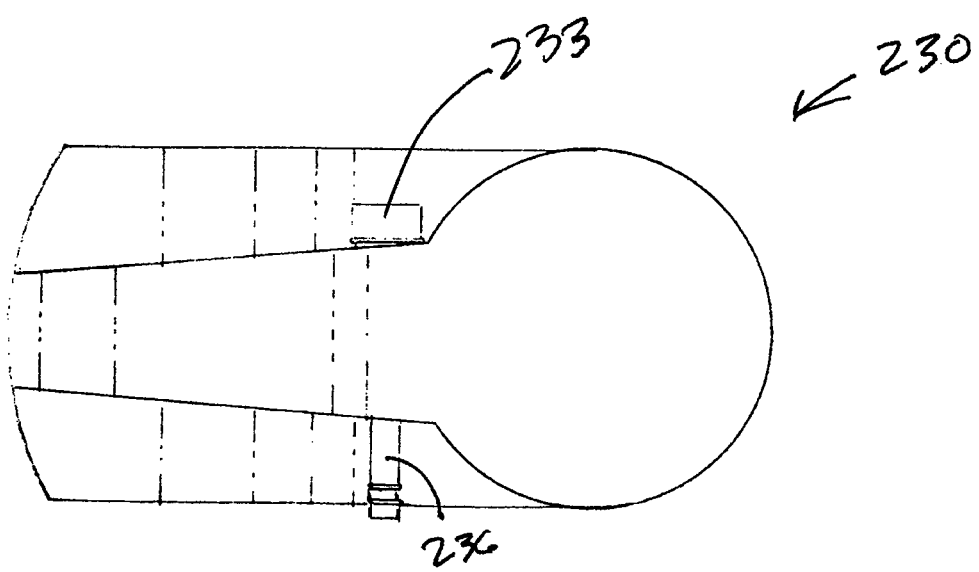

With reference to FIG. 34, shown is the push/pull cam 233 in a second position in which the cam portion 239 of the push/pull cam 233 engages the arm as depicted in FIG. 32. In order to maintain the various positions of the push/pull cam, the various protrusions extend from the side of the push/pull cam 233 that engage portions of the cover of the fill valve 230. Such protrusions engage the holes inherent in the cover of the fill valve 230 and present resistance of the movement of the cam 233, thereby biasing the cam 233 to predefined positions in which the cam portion 239 either engages or does not engage the arm 103 as described.

Figure 35:
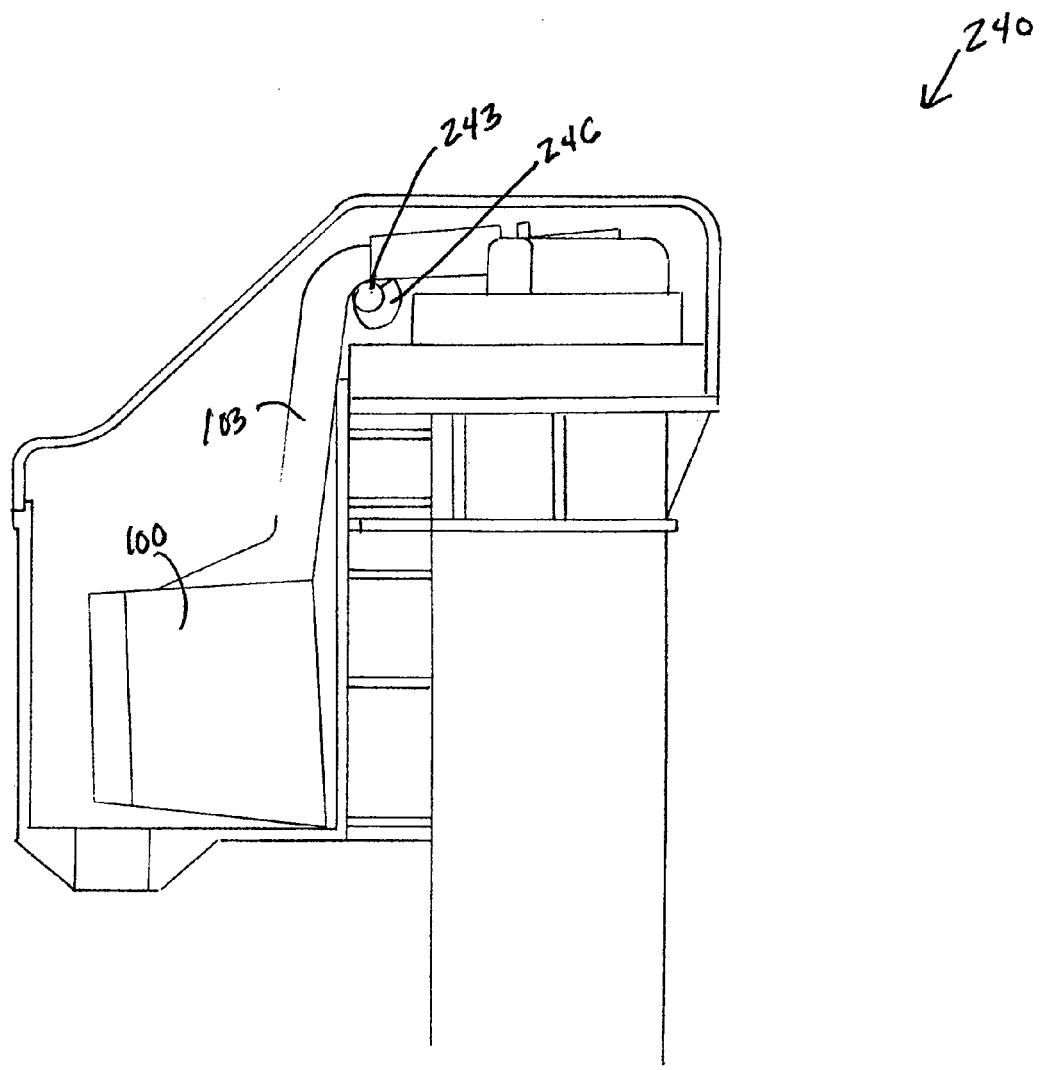
FIGS. 35-37 show various views of a rotating cam locking mechanism in a toilet fill vale according to various embodiments of the present invention.
Figure 36:
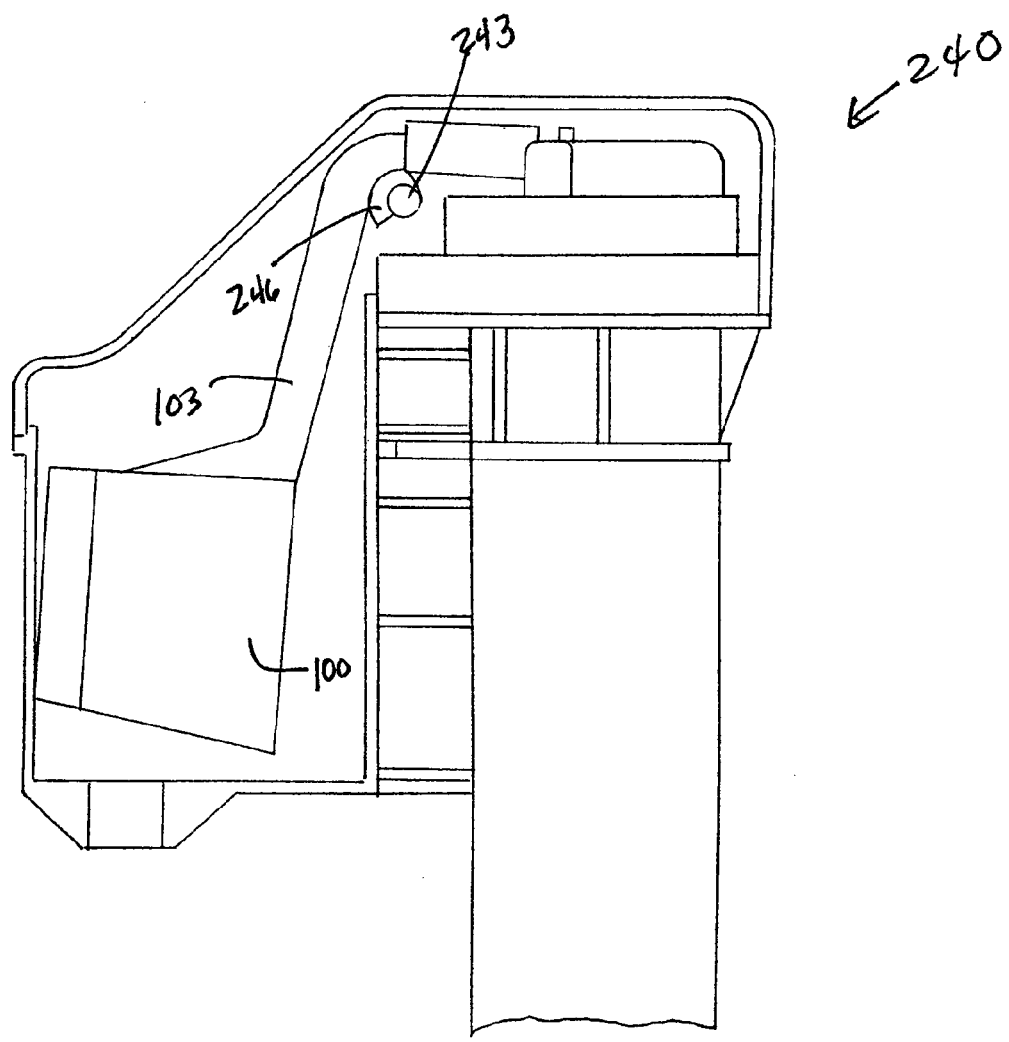
Figure 37:
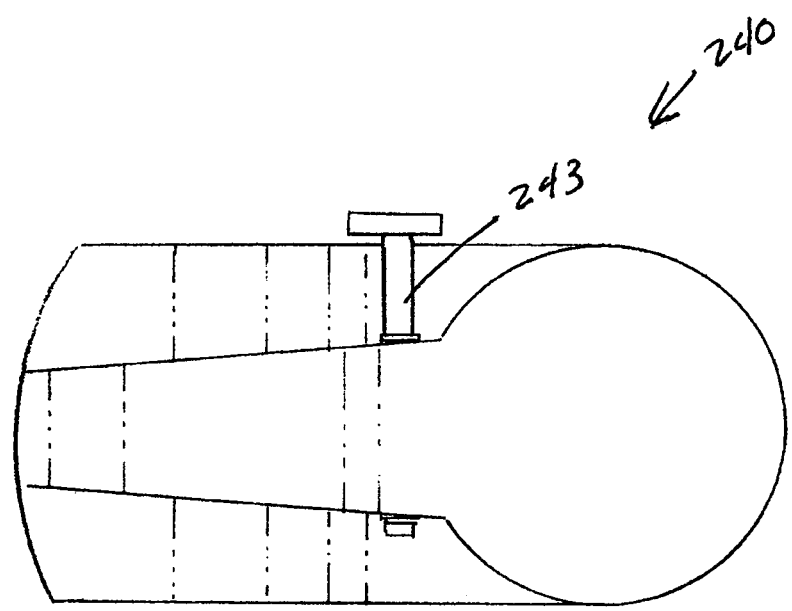

Referring next to FIGS. 35, 36, and 37, shown is a fill valve 240 according to another embodiment in the present invention. The fill valve 240 employs a twisted cam 243 to engage the arm 103 to hold the fill valve 240 in a closed state as will be described. With respect to FIG. 35, shown is the cam 243 with the extended portion 246 that is not engaged with the arm 103. In FIG. 36, the cam 243 has been twisted such that the extended portion 246 engages the arm 103, thereby lifting the arm 103 and causing the fill valve 240 to be closed. With respect to FIG. 35, the fill valve 240 operates normally, given that the arm 103 and the float 100 are free to move throughout their entire range of motion. With reference to FIG. 37, shown is a top view of the fill valve 240 in which the cam 243 is shown with the handle that facilitates the twisting thereof.

Figure 38:
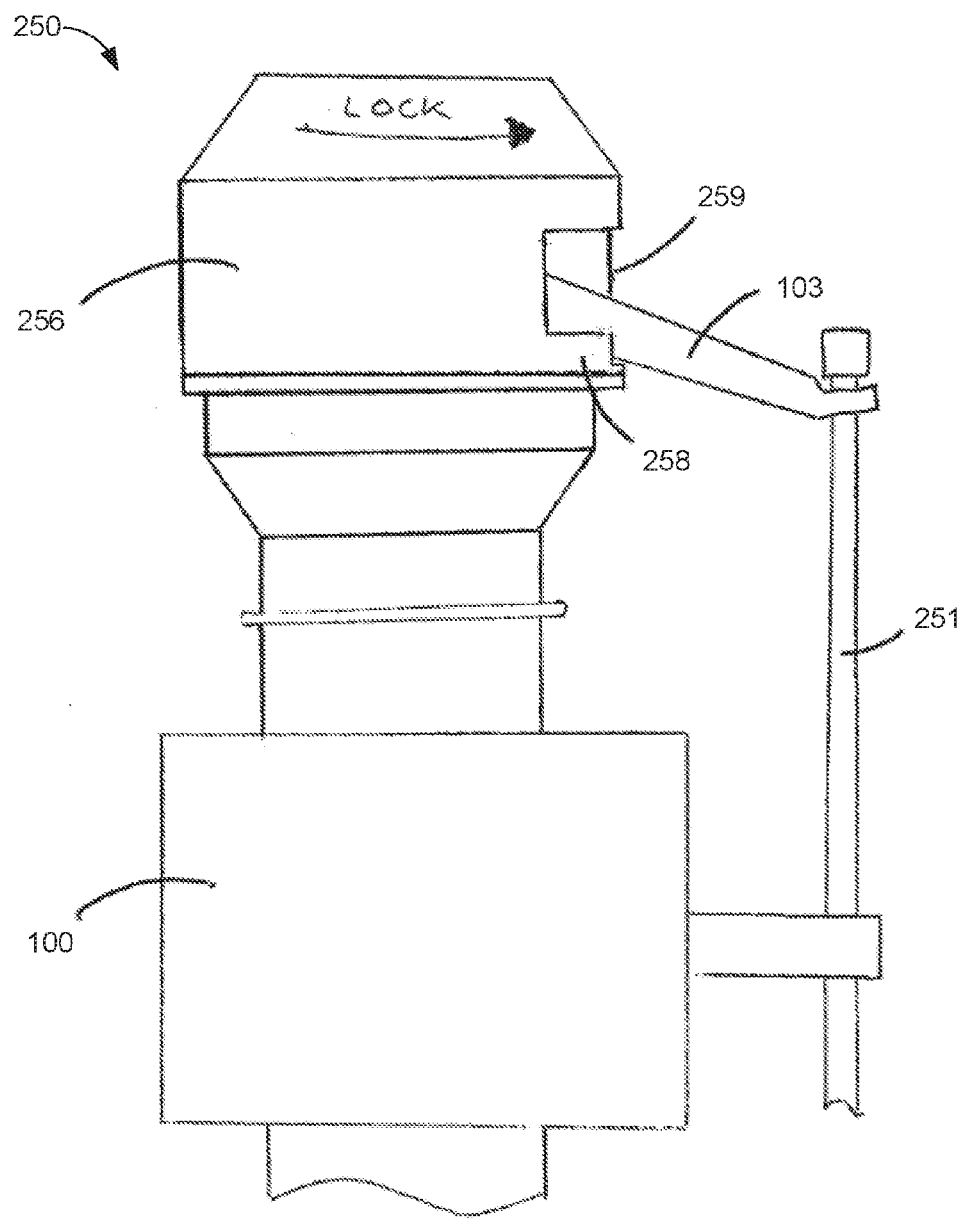
FIGS. 38-43 show various examples of rotating cap toilet fill valve locking mechanisms according to various embodiments of the present invention.
Figure 39:
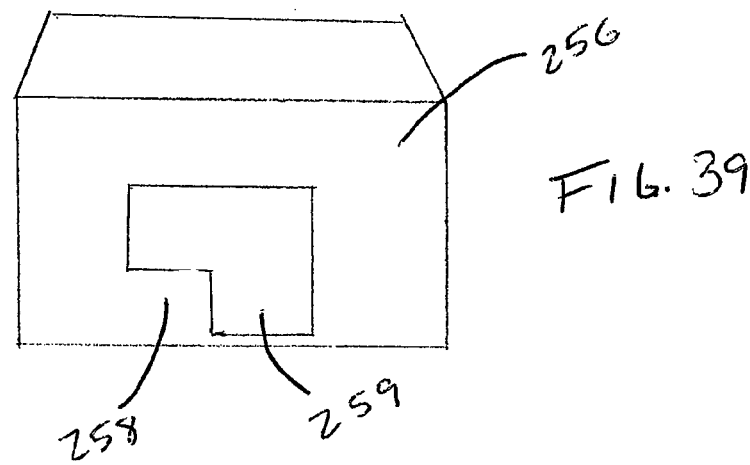
Figure 40:
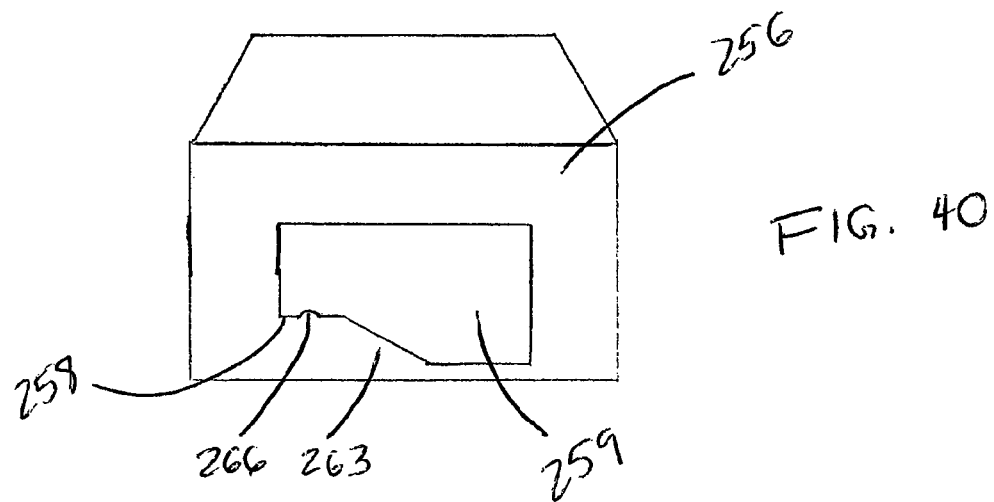

Referring next to FIGS. 38, 39, and 40, shown is a fill valve 250 and alternative caps 256 that are placed on top of the fill valve 250 according to an embodiment of the present invention. As shown, the fill valve 250 includes a float 100 that is coupled to an arm 103 by way of a stem. The top of the fill valve 250 is covered by a cap 256 that rotates relative to the body of the fill valve 250. In this respect, the cap 256 includes a shelf 258 and a full opening 259. In the normal operating state, the cap 256 is rotated such that the arm 103 extends through the full opening 259. When the cap 256 is in this position, the arm 103 can move up and down freely through its entire range of motion, thereby facilitating normal operation of the fill valve 250.

Alternatively, the cap 256 may be rotated so that the bottom of the arm 103 is above the shelf 258, thereby preventing the arm 103 from falling. As a consequence, the fill valve 250 is maintained in a closed state.

The cap 256 is further depicted in FIG. 39 in which the full opening 259 is depicted as well as the shelf 258 in a frontal view.

FIG. 40 shows an alternative cap 256 in which a ramp 263 is disposed between the full opening 259 and the shelf 258. The ramp 263 advantageously facilitates the closing of the fill valve 250 by twisting the cap 256 while the arm 103 has fallen during a flush cycle. Specifically, the ramp 263 lifts the arm 103 as the cap 256 is twisted relative to the body of the fill valve 250. A protrusion 266 extends up from shelf 258, thereby holding the arm 103 on the shelf 258 to keep the fill valve 250 in a closed state. Alternatively, a portion of the cap 250 may be rotatable as opposed to the entire cap to cause the shelf 258 to be located under the arm 103.

Figure 41:
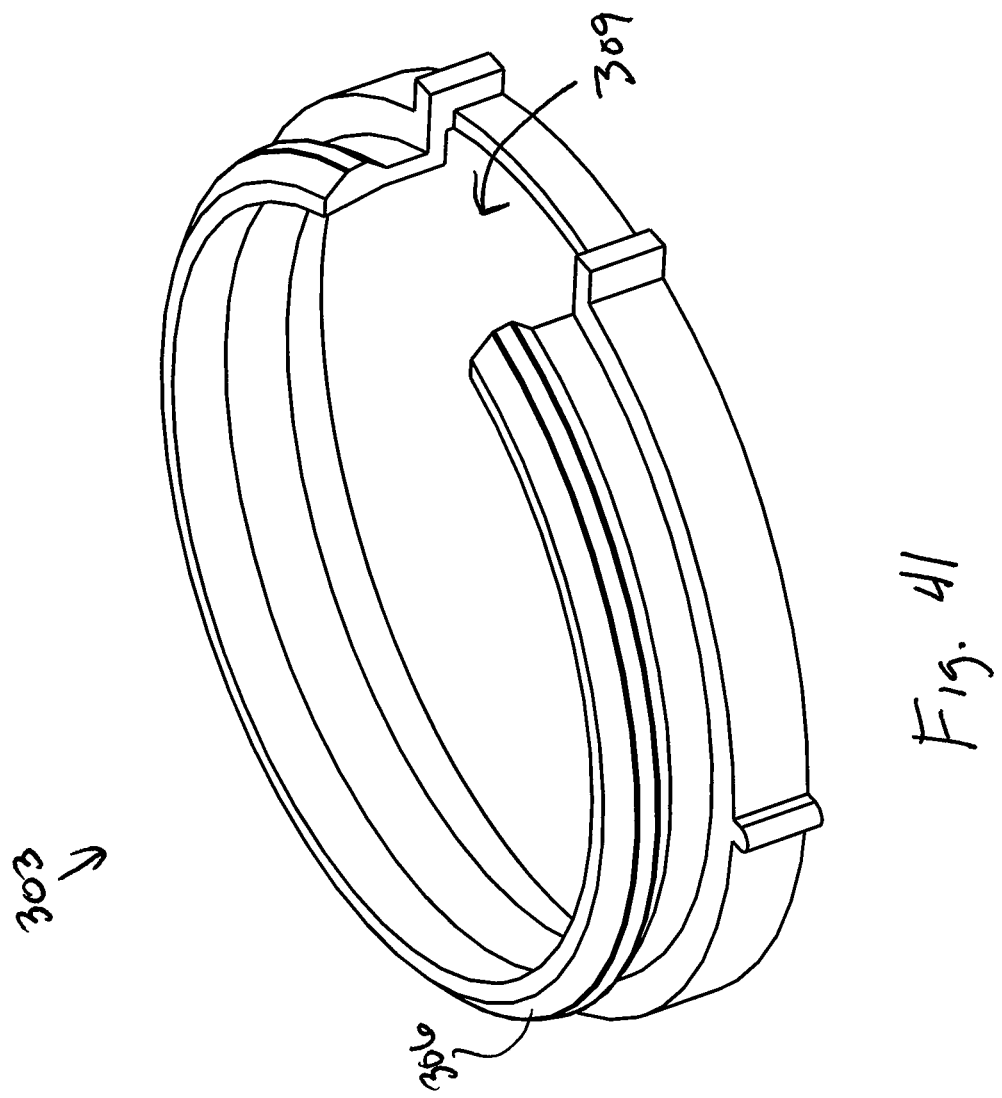
Figure 42:
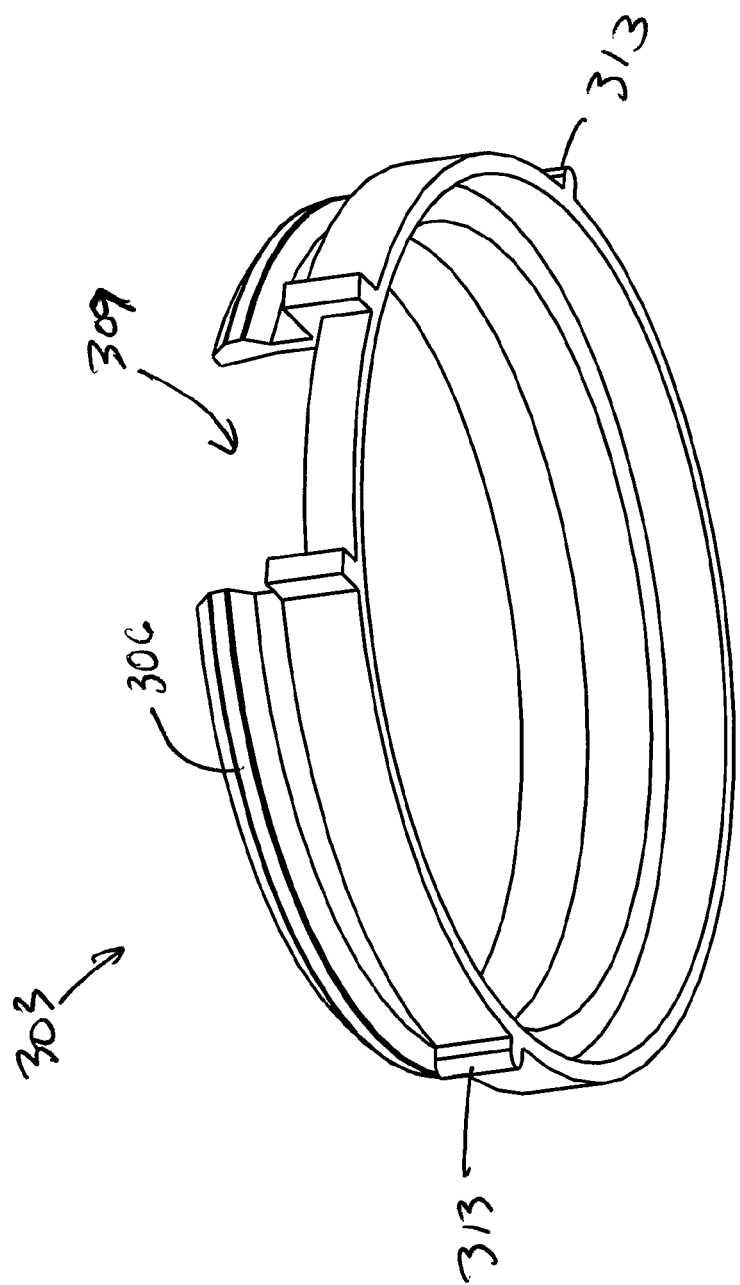
Figure 43:
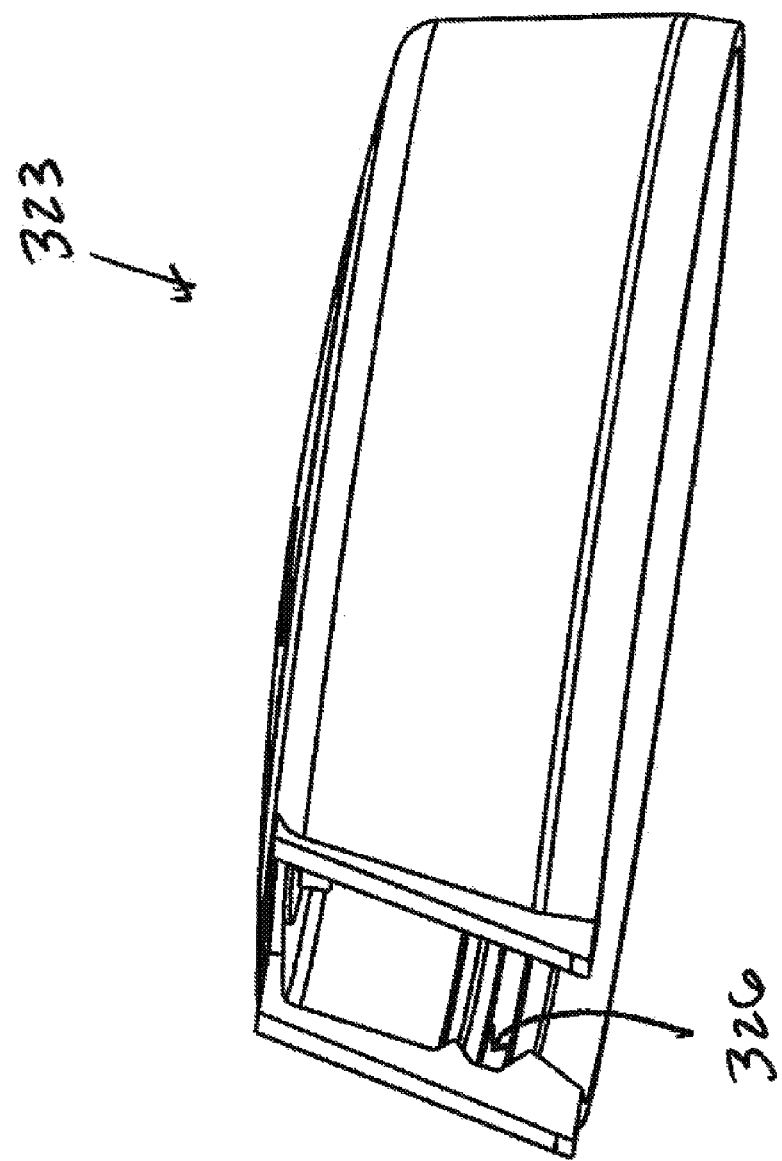

FIGS. 41, 42, and 43 depict a two piece cap structure that may be employed in place of the cap 256. As shown in FIGS. 41 and 42, a ring structure 303 is depicted that includes an upper external projection that forms a shelf 306 around the periphery of the ring structure 303. The ring structure 303 includes a gap 309 through which an arm 103 (FIG. 38) extends. The gap 309 allows the arm 103 to move upward and downward in a free manner during normal operation of the fill valve 250 (FIG. 38). The ring-like structure 303 includes grips 313 that may be grasped by an individual when a cap is affixed thereto in order to rotate the ring structure 303 relative to the fill valve. This allows one to align either the projection portion of the ring structure 303 or the gap 309 with the arm 103 of the toilet fill valve 250. Depending upon whether the gap 309 is aligned with the arm 103, the arm 103 will be able to move freely or the arm 103 may be locked in an upper position corresponding with a closed state of the fill valve 250.

With reference to FIG. 43, shown is a cap 323 that is compatible with the ring-like structure 303 (FIGS. 41 and 42) as described above. The cap 323 includes a circular recess 326 that is compatible with the projection of the shelf 306 and allows the cap 323 to snap fit over the ring-like structure 303. The fit between the cap 323 and the ring structure 303 facilitates rotation of the ring structure 303 when assembled onto a fill valve so that the ring structure 303 may be employed to lock/unlock the operation of the fill valve by aligning either the gap 309 or the shelf 306 with the arm.

Figure 44:
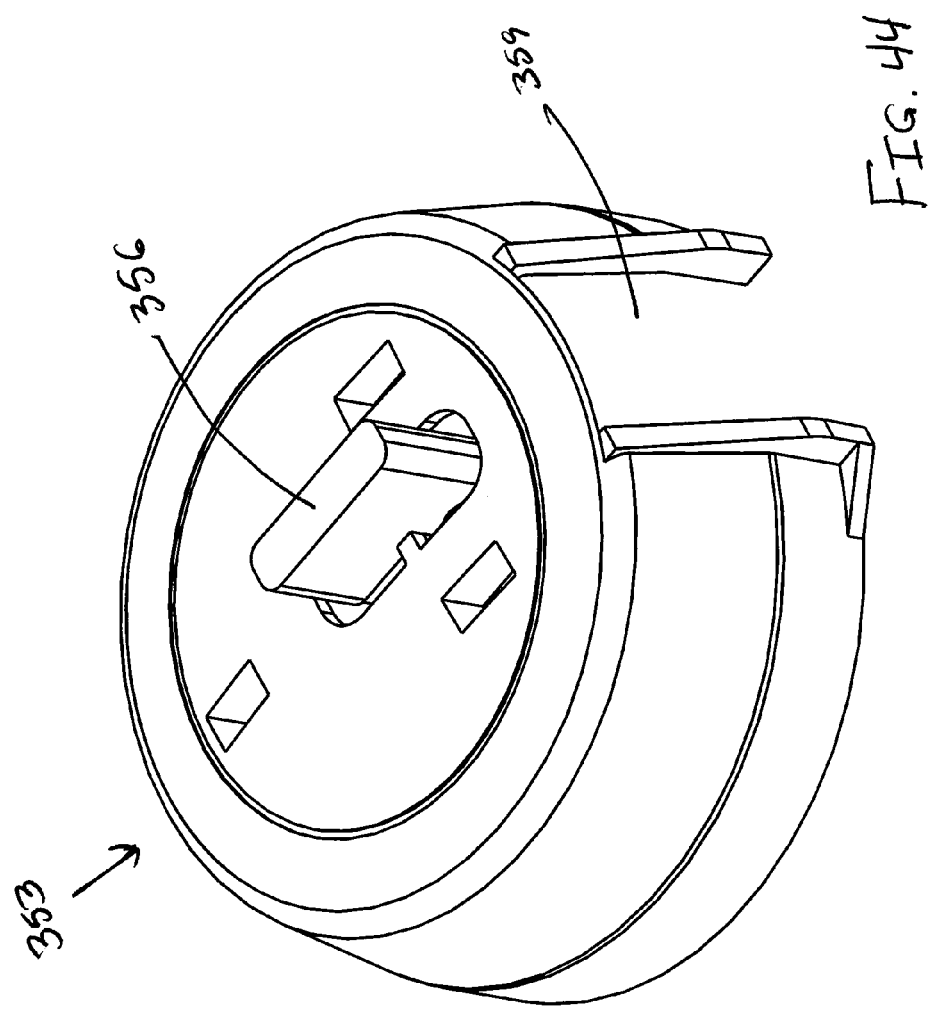

With respect to FIG. 44, shown is a cap 353 that includes a rocker 356 according to an embodiment of the present invention. The cap 353 also includes an opening on the side 359 that facilitates the movement of the arm 103 during a flush cycle during the normal operation of the fill valve 250. In this respect, the cap 353 provides another example of the operation of a fill valve in the manner described with respect to FIG. 1, except that the cap 353 is affixed to the top of the fill valve, as is depicted with respect to the fill valve 250 shown in FIG. 38. The rocker 356 may move from one to the other position as desired to cause the fill valve to close or open and remain in either an open or closed state, as described above.

Figure 45:
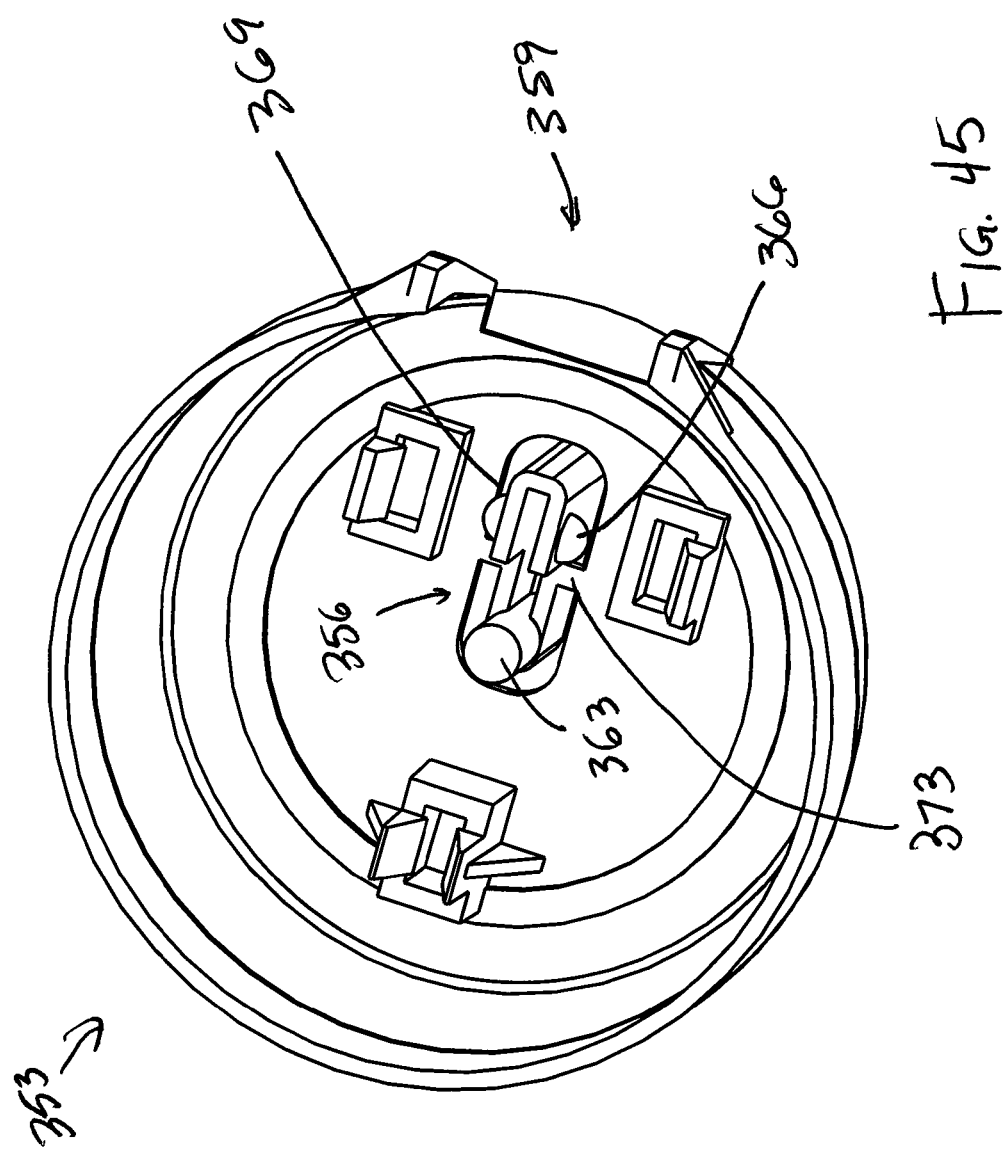
Figure 46:
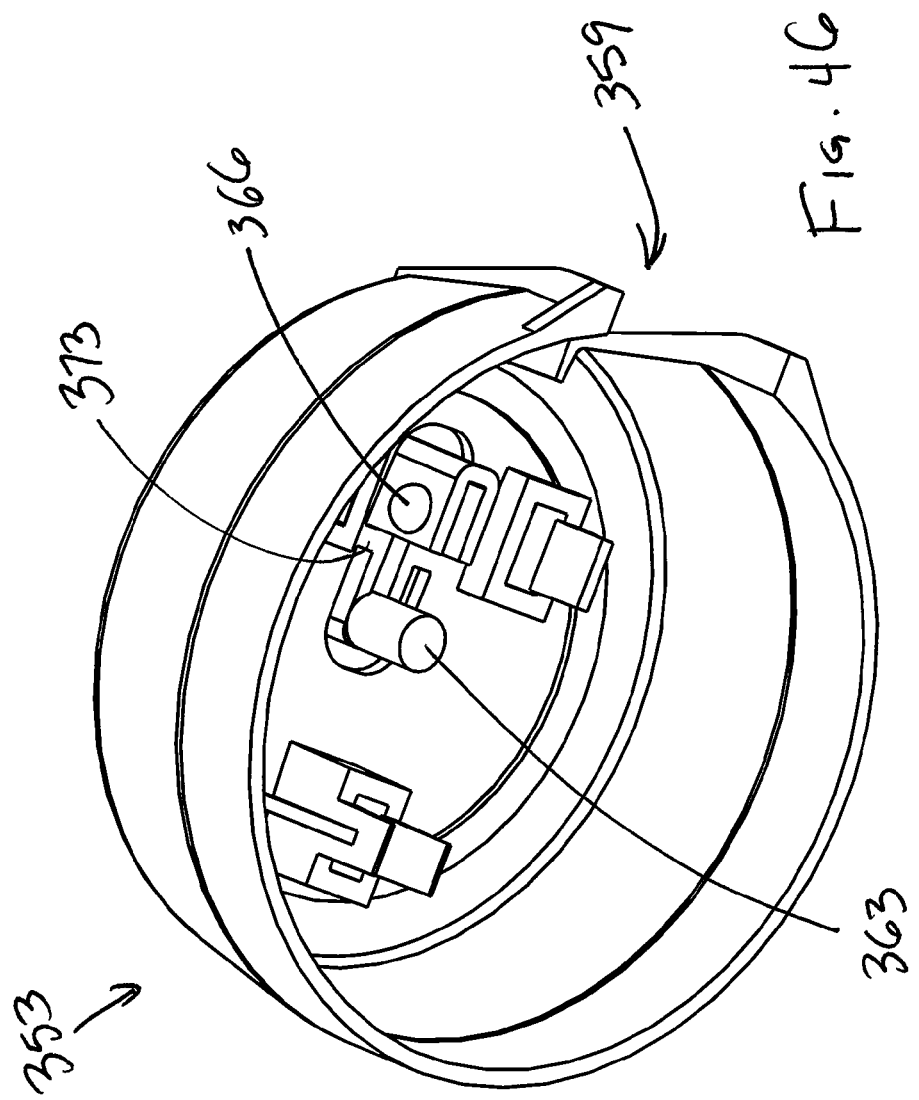

Also, FIGS. 45, 46, and 47 depict a cap structure that includes a rocker switch that functions according to various embodiments described above. Specifically, FIG. 45 depicts an underside of the cap 353 according to various embodiments of the present invention. As shown, the rocker 356 includes a contact surface 363 that comes into contact with various components of the fill valve to cause the fill valve to remain in an open or closed state, as is appropriate. Also, side projections 366 are included on the rocker 356 that engage edges 369 of the cap adjacent to the rocker 356 to hold the rocker in either an open or closed state, as can be appreciated. The rocker twists about an axis formed by a molded connection between the cap structure and the rocker along an axis 373. In order to move the rocker 356 from a first position to a second position, the connection between the rocker and the cap is deformed slightly to provide for the movement of the rocker 356, as can be appreciated. According to one embodiment, the rocker 356 is molded as part of the cap 353, thereby avoiding the need to assemble the rocker and cap together. Alternatively, the rocker 356 may be a separate component with pegs or an axle, for example, that engages clips or other structures, etc. FIGS. 46 and 47 show further views of the cap 353 that illustrate the various features described above according to various embodiments of the invention.

It is understood that the various embodiments of the present invention discussed herein may be shown with respect to a style valve in which the arm 103 is connected to the float 100. However, the principles and designs described herein may equally apply to other styles of fill valves as can be appreciated. In addition, when discussing positions of lock mechanisms described herein in which a fill valve is maintained in a closed state, then the lock mechanisms may be said to be in a lock position. Otherwise, the lock mechanisms are said to be in an unlock position, thereby allowing normal operation of the respective fill valve.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A lockable toilet fill valve, comprising:
   a toilet fill valve comprising a float/arm assembly, the toilet fill valve configured to be closed in response to the float/arm assembly being in a first position, and the toilet fill valve configured to be open in response to the float/arm assembly being in a second position;
   a valve lock associated with the float/arm assembly, the valve lock configured to engage in an unlock position and a lock position, the valve lock configured to restrict the float/arm assembly in the first position in response to the valve lock being engaged in the lock position;
   a cover having a slot; and
   wherein the valve lock comprises a slide mechanism that is configured to restrict movement of the float/arm assembly when the valve lock is engaged in the lock position and allow movement of the float/arm assembly when the valve lock is engaged in the unlock position and the valve lock further comprises a protrusion extending inward from the slide mechanism and adjacent to the float/arm assembly, wherein the protrusion contacts a float of the float/arm assembly when the valve lock is engaged in the lock position.

2. The lockable toilet fill valve of claim 1, wherein the slide mechanism is further configured to be slid along the slot to engage the valve lock in the lock position.

3. The lockable toilet fill valve of claim 1, wherein the slide mechanism is further configured to be slid along the slot to engage the valve lock in the unlock position.

4. The lockable toilet fill valve of claim 1, wherein the protrusion comprises a contact portion configured to contact the float.

5. The lockable toilet fill valve of claim 1, wherein the slide mechanism is configured to engage a securing protrusion to restrict the slide mechanism to a predefined position.

6. The lockable toilet fill valve of claim 5, wherein the predefined position is the lock position.

7. The lockable toilet fill valve of claim 5, wherein the predefined position is the unlock position.

8. A method of operating a toilet fill valve comprising a float/arm assembly and a slide mechanism with a protrusion extending inward, the slide mechanism configured to engage in a lock position and an unlock position, the method comprising the steps of:
   positioning the float/arm assembly in a first position to close the toilet fill valve;

engaging the slide mechanism in the lock position by moving the protrusion of the slide mechanism into contact with a float of the float/arm assembly to restrict movement of the float/arm assembly in the first position;

engaging the slide mechanism in the unlock position by separating the slide mechanism from the float/arm assembly to allow movement of the float/arm assembly when positioned in a second position; and positioning the float/arm assembly in the second position to open the toilet fill valve.

9. The method of operating the toilet fill valve of claim 8, wherein the step of engaging the slide mechanism in the lock position further comprises moving the slide mechanism along a slot in a cover of the toilet fill valve.

10. The method of operating the toilet fill valve of claim 9, wherein engaging the slide mechanism in the lock position further comprises moving the slide mechanism away from a stem portion of the toilet fill valve.

11. The method of operating the toilet fill valve of claim 9, wherein moving the slide mechanism along the slot comprises overcoming a resistance from a securing protrusion on the cover.

12. The method of operating the toilet fill valve of claim 9, wherein engaging the slide mechanism in the lock position further comprises moving the slide mechanism to engage a first securing protrusion of the cover.

13. The method of operating the toilet fill valve of claim 12, wherein engaging the slide mechanism in the unlock position further comprises disengaging the slide mechanism from the first securing protrusion and moving the slide mechanism within the slot to engage a second securing protrusion on the cover.

14. A lockable toilet fill valve, comprising:
a toilet fill valve comprising a float/arm assembly, the toilet fill valve configured to close in response to the float/arm assembly moving to a first position and to open in response to the float/arm assembly moving to a second position; and means for locking the toilet fill valve associated with the float/arm assembly, wherein the means for locking comprises a slide mechanism configured to restrict movement of the float/arm assembly when the means for locking is in a lock position and allow free movement of the float/arm assembly when the means for locking is in an unlock position and a protrusion that extends inward from the slide mechanism and adjacent to the float/arm assembly, wherein the protrusion contacts a float of the float/arm assembly when the means for locking is in the lock position.

15. The lockable toilet fill valve of claim 14, wherein the slide mechanism shifts between the lock position and unlock position by moving along a slot in a cover.

16. The lockable toilet fill value of claim 15, wherein moving the slide mechanism along the slot comprises overcoming a resistance from a securing protrusion on the cover.

17. The lockable toilet fill valve of claim 14, wherein the slide mechanism is configured to engage a securing protrusion to restrict the slide mechanism to a predefined position.

18. The lockable toilet fill valve of claim 14, wherein the protrusion comprises a contact portion configured to contact the float.

19. The lockable toilet fill valve of claim 14, wherein the slide mechanism is configured to be separated from the float/arm assembly to allow the free movement of the float/arm assembly when the means for locking is in the lock position.

20. The lockable toilet fill valve of claim 14, wherein the means for locking engages in the lock position by moving the slide mechanism away from a stem portion of the toilet fill valve.

* * * * *